United States Patent
Rico Alvarino et al.

(10) Patent No.: US 12,323,938 B2
(45) Date of Patent: Jun. 3, 2025

(54) DATA CHANNEL TIMELINES IN WIRELESS COMMUNICATIONS SYSTEMS

(71) Applicant: QUALCOMM Incorporated, San Diego, CA (US)

(72) Inventors: Alberto Rico Alvarino, San Diego, CA (US); Seyedkianoush Hosseini, San Diego, CA (US); Xiao Feng Wang, San Diego, CA (US); Liangping Ma, San Diego, CA (US); Ayan Sengupta, San Diego, CA (US); Jun Ma, San Diego, CA (US); Huilin Xu, Temecula, CA (US); Peter Gaal, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/296,732

(22) Filed: Apr. 6, 2023

(65) Prior Publication Data
US 2023/0247577 A1     Aug. 3, 2023

Related U.S. Application Data

(62) Division of application No. 17/173,682, filed on Feb. 11, 2021.
(Continued)

(51) Int. Cl.
*H04W 56/00*     (2009.01)
*H04L 1/1812*     (2023.01)
(Continued)

(52) U.S. Cl.
CPC .......... *H04W 56/009* (2013.01); *H04L 1/1819* (2013.01); *H04L 27/26025* (2021.01);
(Continued)

(58) Field of Classification Search
CPC ............. H04W 56/009; H04W 56/005; H04W 72/0446; H04W 72/23; H04L 1/1819; H04L 27/26025
See application file for complete search history.

(56) References Cited

U.S. PATENT DOCUMENTS

| | | | |
|---|---|---|---|
| 7,248,841 B2 | 7/2007 | Agee et al. | |
| 9,781,717 B2 | 10/2017 | Zhao et al. | |

(Continued)

FOREIGN PATENT DOCUMENTS

| | | | |
|---|---|---|---|
| CN | 107371271 A | 11/2017 | |
| CN | 109819511 A | 5/2019 | |

(Continued)

OTHER PUBLICATIONS

3GPP TS 38.104: "3rd Generation Partnership Project, Technical Specification Group Radio Access Network, NR, Base Station (BS) Radio Transmission and Reception (Release 15)", V15.2.0 (Jun. 2018), pp. 1-147.
(Continued)

*Primary Examiner* — Christine Ng
(74) *Attorney, Agent, or Firm* — Holland & Hart LLP

(57) ABSTRACT

A scheduling offset between an uplink and downlink radio frame timing structure of a user equipment (UE) may be updated to provide for more efficient utilization of hybrid automatic repeat request (HARQ) processes in a non-terrestrial network. For instance, different UEs may experience different round trip delays (RTDs) with a non-terrestrial cell. Different UEs may be configured with different scheduling offsets such that scheduling delays may be reduced and HARQ processes identifiers may be reused more rapidly. Additionally or alternatively, wireless communications systems may define one or more separation distances (or timing thresholds) for timing between communications and HARQ processes may be reused based on the separation distance (Continued)

threshold (e.g., such that a satellite may reuse a HARQ process ID for two scheduled communications that have not yet been performed by the UE).

28 Claims, 19 Drawing Sheets

Related U.S. Application Data

(60) Provisional application No. 63/003,758, filed on Apr. 1, 2020.

(51) Int. Cl.
*H04L 27/26* (2006.01)
*H04W 72/0446* (2023.01)
*H04W 72/23* (2023.01)
*H04W 74/0833* (2024.01)
*H04W 84/06* (2009.01)

(52) U.S. Cl.
CPC ..... *H04W 56/005* (2013.01); *H04W 72/0446* (2013.01); *H04W 72/23* (2023.01); *H04W 74/0833* (2013.01); *H04W 84/06* (2013.01)

(56) References Cited

U.S. PATENT DOCUMENTS

| | | | |
|---|---|---|---|
| 10,219,776 B2 | 3/2019 | Belei et al. | |
| 10,624,052 B2 | 4/2020 | Alasti et al. | |
| 11,166,065 B1 | 11/2021 | Camargo et al. | |
| 11,469,815 B2 | 10/2022 | Hsieh et al. | |
| 11,522,658 B2 | 12/2022 | Harrison et al. | |
| 11,523,344 B2 | 12/2022 | Song et al. | |
| 11,546,935 B2 | 1/2023 | Huang et al. | |
| 11,570,646 B2 | 1/2023 | Sarkis et al. | |
| 11,576,035 B2 | 2/2023 | Ekpenyong et al. | |
| 11,595,928 B2 | 2/2023 | Lin | |
| 11,659,599 B2 | 5/2023 | Ma et al. | |
| 11,711,171 B2* | 7/2023 | Salem | H04L 1/1819 370/329 |
| 2005/0058149 A1 | 3/2005 | Howe | |
| 2007/0211657 A1* | 9/2007 | McBeath | H04W 72/0446 370/347 |
| 2012/0269180 A1* | 10/2012 | Li | H04L 1/1887 370/336 |
| 2013/0034066 A1 | 2/2013 | Kakishima et al. | |
| 2013/0100936 A1* | 4/2013 | Pettersson | H04W 72/0446 370/336 |
| 2015/0181544 A1 | 6/2015 | Liu et al. | |
| 2017/0201974 A1 | 7/2017 | Sohn et al. | |
| 2017/0318605 A1* | 11/2017 | Wijetunge | H04W 72/12 |
| 2019/0075536 A1* | 3/2019 | Hans | H04W 56/0045 |
| 2019/0090261 A1 | 3/2019 | Yang | |
| 2019/0190661 A1* | 6/2019 | You | H04W 74/0833 |
| 2019/0207719 A1* | 7/2019 | Shevchenko | H03M 13/096 |
| 2019/0306848 A1 | 10/2019 | Zhou et al. | |
| 2019/0349877 A1 | 11/2019 | Alasti et al. | |
| 2020/0120458 A1 | 4/2020 | Aldana et al. | |
| 2020/0274654 A1* | 8/2020 | Loehr | H04L 1/1887 |
| 2020/0295824 A1 | 9/2020 | Charbit et al. | |
| 2020/0314816 A1 | 10/2020 | Yi et al. | |
| 2021/0029658 A1 | 1/2021 | Mahalingam et al. | |
| 2021/0068142 A1 | 3/2021 | Park et al. | |
| 2021/0105761 A1 | 4/2021 | Cheng et al. | |
| 2021/0314889 A1 | 10/2021 | Rico Alvarino et al. | |
| 2021/0314892 A1 | 10/2021 | Rico Alvarino et al. | |
| 2021/0352708 A1 | 11/2021 | Seo et al. | |
| 2022/0015120 A1 | 1/2022 | Qiu et al. | |
| 2022/0030562 A1 | 1/2022 | Yi et al. | |
| 2022/0039140 A1 | 2/2022 | Yi et al. | |
| 2022/0046679 A1 | 2/2022 | Yeo et al. | |
| 2022/0070809 A1* | 3/2022 | Song | H04W 72/0446 |
| 2022/0086671 A1 | 3/2022 | Hong | |
| 2022/0086715 A1 | 3/2022 | Hong et al. | |
| 2022/0095258 A1 | 3/2022 | Yeo et al. | |
| 2022/0110146 A1 | 4/2022 | Xu et al. | |
| 2022/0124795 A1 | 4/2022 | Wu et al. | |
| 2022/0200740 A1* | 6/2022 | Zou | H04L 1/188 |
| 2022/0287048 A1 | 9/2022 | Lin | |
| 2022/0321272 A1* | 10/2022 | Yoshioka | H04L 1/1812 |
| 2022/0386382 A1 | 12/2022 | Medeiros De Amorim et al. | |
| 2023/0039715 A1 | 2/2023 | Ye et al. | |
| 2023/0345494 A1 | 10/2023 | Harrison et al. | |
| 2024/0276404 A1 | 8/2024 | Rico Alvarino et al. | |

FOREIGN PATENT DOCUMENTS

| | | |
|---|---|---|
| EP | 2824979 A1 | 1/2015 |
| EP | 3454487 A1 | 3/2019 |
| EP | 3588836 A1 | 1/2020 |
| WO | WO-2015175291 A1 | 11/2015 |
| WO | WO-2018003903 A1 | 1/2018 |
| WO | 2019195457 A1 | 10/2019 |
| WO | 2020031120 A2 | 2/2020 |
| WO | 2020031155 A1 | 2/2020 |
| WO | 2020032757 A1 | 2/2020 |
| WO | 2020034564 A1 | 2/2020 |

OTHER PUBLICATIONS

CMCC: "Discussion on UL Transmission Timing for NTN", 3GPP Draft, R1-1912535, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823469, pp. 1-3, Section 2.

Dish Network: "On Timing Advance for NTN", 3GPP Draft, 3GPP TSG RAN WG1 Meeting #96Bis, R1-1905215, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 7, 2019 (Apr. 7, 2019), XP051700290, 3 Pages, sections 2.2-2.3, sections 2.

Ericsson: "Remaining Details on Random Access for NTN", 3GPP Draft, 3GPP TSG-RAN WG2 #108, R2-1915567, 3rd Generation Partnership Project (3GPP), Mobile Competence Centre, 650, Route Des Lucioles, F-06921 Sophia-Antipolis Cedex, France, vol. RAN WG2, No. Reno, Nevada, US, Nov. 18, 2019-Nov. 22, 2019, Nov. 7, 2019 (Nov. 7, 2019), XP051815978, 7 Pages, Section 2.1.

International Preliminary Report on Patentability—PCT/US2021/017953 The International Bureau of WIPO—Geneva, Switzerland, dated Oct. 13, 2022.

International Preliminary Report on Patentability—PCT/US2021/024699 The International Bureau of WIPO—Geneva, Switzerland, dated Oct. 13, 2022.

International Search Report and Written Opinion—PCT/US2021/017953—ISA/EPO—dated Sep. 13, 2021.

International Search Report and Written Opinion—PCT/US2021/024699—ISA/EPO—dated Sep. 30, 2021.

Mediatek Inc: "Delay-Tolerant Re-Transmission Mechanisms in NR-NTN", 3GPP Draft, 3GPP TSG RAN WG1 Meeting #96bis, R1-1904646, Mediatek-Delay-Tolerant Re-Transmission Mechanisms in NR-NTN, 3rd Generation Partnership Project (3GPP), Mobile Competence Centre, 650, Route Des Lucioles, F-06921 Sophia-Ant, vol. RAN WG1, No. Xian, China, Apr. 8, 2019-Apr. 12, 2019, Apr. 7, 2019 (Apr. 7, 2019), XP051699855, 5 Pages, Section 2 Section 4 p. 3; figure 3.

Mediatek Inc: "Remaining Issues on Enhancements to HARQ for NR-U Operation", 3GPP Draft, 3GPP TSG RAN WG1 #100, R1-2000439, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 15, 2020 (Feb. 15, 2020), XP051853301, 5 Pages, Section 2.1 p. 1, figure 1 p. 2, figure 2.

Moderator (Ericsson): "Feature Lead Summary on Timing Relationship Enhancements", R1-200xxxx, 3GPP TSG-RAN WG1 Meet-

(56) References Cited

OTHER PUBLICATIONS ing#102-e, Document for: Discussion, Agenda Item, Jan. 1, 2020 (Jan. 1, 2020), XP055743390, pp. 1-64, Section 2.
Panasonic: "Issues on Timing Advance and RACH for NTN", 3GPP Draft, R1-1906264, 3GPP TSG RAN WG1 #97, NTN RACH, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 1, 2019 (May 1, 2019), XP051708302, 4 Pages, p. 1, Line 1, paragraph 2-line 2 p. 2. line 3-line 4 p. 1. line 11. paragraph 2-line 14.
Partial International Search Report—PCT/US2021/017953—ISA/EPO—dated Jun. 2, 2021.
Partial International Search Report—PCT/US2021/024699—ISA/EPO—dated Jul. 13, 2021.
Qualcomm Incorporated: "TP for Enhancements to Scheduling and HARQ Operation for NR-U", 3GPP Draft, 3GPP TSGRAN WG1 Meeting#100e, R1-2000958, 3rd Generation Partnership Project (3GPP), Mobile Competence Centre, 650, Route Des Lucioles, F-06921 Sophia-Antipolis Cedex, France, vol. RAN WG1, No. Feb. 24, 2020-Mar. 6, 2020, Feb. 15, 2020 (Feb. 15, 2020), XP051853533, 6 Pages, Section 3 p. 3, figure 1.
Vivo: "Remaining Issues on HARQ Operation for NR-U", 3GPP Draft, 3GPP TSG RAN WG1 #100, R1-2000311, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051852800, 18 Pages, Section 2.1.1. p. 3; figure 1 p. 4; figure 2.
Panasonic: "Timing Advance and PRACH Design for NTN", 3GPP TSG RAN WG1 #99, R1-1912903, Reno, USA, Nov. 18-22, 2019, 13 Pages.
Vivo: "Remaining Issues on HARQ Operation for NR-U", 3GPP Draft, 3GPP TSG RAN WG1 #100, R1-2000311, 3rd Generation Partnership Project (3GPP), Mobile Competence Centre, 650, Route Des Lucioles, F-06921 Sophia-Antipolis Cedex, France, vol. RAN WG1, No. e-Meeting, Feb. 24, 2020-Mar. 6, 2020, Feb. 14, 2020 (Feb. 14, 2020), XP051852800, 18 Pages, Section 2.1.1. page 3; figure 1 p. 4; figure 2.

\* cited by examiner

DATA CHANNEL TIMELINES IN WIRELESS COMMUNICATIONS SYSTEMS

CROSS REFERENCE

The present application for patent is a Divisional of U.S. patent application Ser. No. 17/173,682 by RICO ALVARINO et al., entitled "DATA CHANNEL TIMELINES IN WIRELESS COMMUNICATIONS SYSTEMS" filed Feb. 11, 2021, which claims the benefit of U.S. Provisional Patent Application No. 63/003,758 by RICO ALVARINO et al., entitled "DATA CHANNEL TIMELINES IN WIRELESS COMMUNICATIONS SYSTEMS," filed Apr. 1, 2020, each of which is assigned to the assignee hereof, and each of which is expressly incorporated by reference herein.

FIELD OF TECHNOLOGY

The following relates generally to wireless communications and more specifically to improved data channel timelines in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, such as in systems in which a gateway or base station and a UE are a part of a non-terrestrial network (NTN), there may be a large distance between the UE and a serving node of the UE. Because of the distance between UEs and gateways in such systems, there may be a relatively long round trip delay (RTD) or propagation delay in message transmissions between the UE and gateway (e.g., relative to terrestrial networks). Efficient techniques for managing communications with such relatively long round trip or propagation delays may thus be desirable for such systems.

SUMMARY

The described techniques relate to improved methods, systems, devices, and apparatuses that support improved data channel timelines in wireless communications systems (e.g., in non-terrestrial networks (NTNs)). Generally, the described techniques provide for improved feedback processes between devices (e.g., user equipment (UEs) and satellites) communicating via an NTN. For example, the techniques described herein may be implemented to efficiently manage hybrid automatic repeat request (HARQ) processes used by a satellite for communications with a UE. In some cases, a quantity of implementable HARQ process may be limited, which may impact a scheduling of uplink and downlink communications in wireless communications systems (such as NTNs) associated with large propagation delays and UEs with varying frame timing. According to the techniques described herein, timing enhancements and HARQ process enhancements may be employed by an NTN to account for such large propagation delays and varying frame timing of different UEs within the NTN.

In some cases, a scheduling offset ($K_{offset}$) between a UE's uplink and downlink radio frame timing structure may be updated (e.g., once the UE is in a radio resource control (RRC) connected mode) to provide for more efficient utilization of HARQ processes. For instance, a UE within close proximity to a satellite, relative to other UEs within the cell, may be configured with an updated (e.g., reduced) scheduling offset such that scheduling delays may be reduced and thus HARQ processes may be reused more rapidly (e.g., without a satellite reusing a HARQ process identifier (ID) for two scheduled communications that have not yet been performed by the UE). Additionally or alternatively, wireless communications systems may define one or more separation distances (e.g., or timing thresholds) for timing between communications (e.g., consecutive transmissions) and HARQ processes may be reused based on the separation distance threshold (e.g., such that a satellite may reuse a HARQ process ID for two scheduled communications or transmissions that have not yet been performed by the UE). For instance, a separation distance (in time) between two uplink communications may be defined and a HARQ process may be reused for scheduling the two uplink communications (e.g., where the latter uplink communication may be scheduled prior to the UE performing the first uplink communication).

A method of wireless communication at a UE is described. The method may include receiving a system information message including a first indication of a first transmission timing offset for a cell in an NTN, receiving an RRC message including a second indication of a second transmission timing offset, and transmitting an uplink message based on the second transmission timing offset.

An apparatus for wireless communication at a UE is described. The apparatus may include a processor, memory coupled with the processor, and instructions stored in the memory. The instructions may be operable, when executed by the processor, to cause the apparatus to receive a system information message including a first indication of a first transmission timing offset for a cell in an NTN, receive an RRC message including a second indication of a second transmission timing offset, and transmit an uplink message based on the second transmission timing offset.

Another apparatus for wireless communication at a UE is described. The apparatus may include means for receiving a system information message including a first indication of a first transmission timing offset for a cell in an NTN, receiving an RRC message including a second indication of a second transmission timing offset, and transmitting an uplink message based on the second transmission timing offset.

A non-transitory computer-readable medium storing code for wireless communication at a UE is described. The code may include instructions executable by a processor to receive a system information message including a first indication of a first transmission timing offset for a cell in an NTN, receive an RRC message including a second indication of a second transmission timing offset, and transmit an uplink message based on the second transmission timing offset.

Some examples of the method, apparatuses, and non-transitory computer-readable medium described herein may further include operations, features, means, or instructions for transmitting a random access channel (RACH) message based on the first transmission timing offset, and establishing an RRC connection with a base station based on the RACH message, where the RRC message may be received based on the RRC connection.

Some examples of the method, apparatuses, and non-transitory computer-readable medium described herein may further include operations, features, means, or instructions for identifying a radio network temporary identifier (RNTI) associated with the RACH message, and applying the first transmission timing offset when transmitting the RACH message based on the RNTI, where the RACH message may be transmitted based on the first transmission timing offset.

Some examples of the method, apparatuses, and non-transitory computer-readable medium described herein may further include operations, features, means, or instructions for determining a timing advance (TA) and a differential offset based on the first transmission timing offset and a round trip time (RTT), where the RACH message includes a third indication of the TA and the differential offset.

Some examples of the method, apparatuses, and non-transitory computer-readable medium described herein may further include operations, features, means, or instructions for determining the RTT for communications between the UE and the cell of the NTN, where the determining of the TA and the differential offset may be based on the determining of the RTT.

In some examples of the method, apparatuses, and non-transitory computer-readable medium described herein, the second transmission timing offset may be based on the third indication of the TA and the differential offset.

Some examples of the method, apparatuses, and non-transitory computer-readable medium described herein may further include operations, features, means, or instructions for receiving a downlink control information (DCI) message including a grant for the uplink message, identifying an RNTI associated with the DCI message, and applying the second transmission timing offset when transmitting the uplink message based on the RNTI, where the uplink message may be transmitted based on the grant and the second transmission timing offset.

Some examples of the method, apparatuses, and non-transitory computer-readable medium described herein may further include operations, features, means, or instructions for receiving a DCI message including a grant for a downlink shared channel message, monitoring for the downlink shared channel message based on the grant, and determining acknowledgement (ACK) feedback for the downlink shared channel message based on the monitoring, where the uplink message includes the ACK feedback for the downlink shared channel message.

Some examples of the method, apparatuses, and non-transitory computer-readable medium described herein may further include operations, features, means, or instructions for determining the second transmission timing offset based on adding the first transmission timing offset and a negative offset, where the second indication includes the negative offset.

In some examples of the method, apparatuses, and non-transitory computer-readable medium described herein, the transmitting of the uplink message based on the second transmission timing offset may include operations, features, means, or instructions for determining an uplink slot for transmission of the uplink message based on the second transmission timing offset and a downlink slot associated with a DCI message corresponding to the uplink message, where the uplink message may be transmitted in the uplink slot.

In some examples of the method, apparatuses, and non-transitory computer-readable medium described herein, the second transmission timing offset may be based on an RTT for communications between the UE and the cell in the NTN.

A method of wireless communication at a UE is described. The method may include receiving a first DCI message scheduling a first uplink message associated with a HARQ process, receiving a second DCI message scheduling a second uplink message associated with the HARQ process, and transmitting the first uplink message after receiving the second DCI message.

An apparatus for wireless communication at a UE is described. The apparatus may include a processor, memory coupled with the processor, and instructions stored in the memory. The instructions may be operable, when executed by the processor, to cause the apparatus to receive a first DCI message scheduling a first uplink message associated with a HARQ process, receive a second DCI message scheduling a second uplink message associated with the HARQ process, and transmit the first uplink message after receiving the second DCI message.

Another apparatus for wireless communication at a UE is described. The apparatus may include means for receiving a first DCI message scheduling a first uplink message associated with a HARQ process, receiving a second DCI message scheduling a second uplink message associated with the HARQ process, and transmitting the first uplink message after receiving the second DCI message.

A non-transitory computer-readable medium storing code for wireless communication at a UE is described. The code may include instructions executable by a processor to receive a first DCI message scheduling a first uplink message associated with a HARQ process, receive a second DCI message scheduling a second uplink message associated with the HARQ process, and transmit the first uplink message after receiving the second DCI message.

Some examples of the method, apparatuses, and non-transitory computer-readable medium described herein may further include operations, features, means, or instructions for identifying that the HARQ process may be associated with a single transmission attempt, where the transmitting of the first uplink message may be based on the identifying. Some examples of the method, apparatuses, and non-transitory computer-readable medium described herein may further include operations, features, means, or instructions for identifying that the first uplink message and the second uplink message may be associated with a same transport block (TB), where the transmitting of the first uplink message may be based on the identifying.

In some examples of the method, apparatuses, and non-transitory computer-readable medium described herein, a time duration between the first uplink message and the second uplink message includes a separation threshold. In some examples of the method, apparatuses, and non-transitory computer-readable medium described herein, a time duration between the first DCI message and the second DCI message includes a separation threshold.

In some examples of the method, apparatuses, and non-transitory computer-readable medium described herein, the separation threshold includes a quantity of slots or a quantity of symbols. In some examples of the method, apparatuses, and non-transitory computer-readable medium described herein, the separation threshold may be based on a numerology. In some examples of the method, apparatuses, and non-transitory computer-readable medium described herein, the second DCI message may be received within a time interval prior to the transmitting of the first uplink message. In some examples of the method, apparatuses, and non-transitory computer-readable medium described herein, the time interval may be based on a transmission timing offset and a TA associated with the transmitting of the first uplink message.

Some examples of the method, apparatuses, and non-transitory computer-readable medium described herein may further include operations, features, means, or instructions for transmitting a first indication of a first quantity of supported HARQ processes based on a capability of the UE, and receiving a second indication of a second quantity of HARQ processes based on the first indication of the first quantity of supported HARQ processes, where an ID of the HARQ process may be based on the second quantity of HARQ processes.

In some examples of the method, apparatuses, and non-transitory computer-readable medium described herein, the second quantity of HARQ processes may be based on one or more of a TA associated with transmitting of the first uplink message, a numerology, and a differential offset associated with the UE. In some examples of the method, apparatuses, and non-transitory computer-readable medium described herein, the second quantity of HARQ processes may be based on an NTN cell.

Some examples of the method, apparatuses, and non-transitory computer-readable medium described herein may further include operations, features, means, or instructions for monitoring for a first downlink shared channel message based on a grant, where the first DCI message includes the grant, and determining ACK feedback for the first downlink shared channel message based on the monitoring, where the first uplink message includes the ACK feedback for the first downlink shared channel message. In some examples of the method, apparatuses, and non-transitory computer-readable medium described herein, a time duration between the first downlink shared channel message and a second downlink shared channel message includes a separation threshold.

A method of wireless communication at a base station is described. The method may include transmitting, to a UE, a system information message including a first indication of a first transmission timing offset for a cell in an NTN, transmitting, to the UE, an RRC message including a second indication of a second transmission timing offset that is based on an RTT for communications between the UE and the cell in the NTN, and receiving, from the UE, an uplink message based on the second transmission timing offset.

An apparatus for wireless communication at a base station is described. The apparatus may include a processor, memory coupled with the processor, and instructions stored in the memory. The instructions may be operable, when executed by the processor, to cause the apparatus to transmit, to a UE, a system information message including a first indication of a first transmission timing offset for a cell in an NTN, transmit, to the UE, an RRC message including a second indication of a second transmission timing offset that is based on an RTT for communications between the UE and the cell in the NTN, and receive, from the UE, an uplink message based on the second transmission timing offset.

Another apparatus for wireless communication at a base station is described. The apparatus may include means for transmitting, to a UE, a system information message including a first indication of a first transmission timing offset for a cell in an NTN, transmitting, to the UE, an RRC message including a second indication of a second transmission timing offset that is based on an RTT for communications between the UE and the cell in the NTN, and receiving, from the UE, an uplink message based on the second transmission timing offset.

A non-transitory computer-readable medium storing code for wireless communication at a base station is described. The code may include instructions executable by a processor to transmit, to a UE, a system information message including a first indication of a first transmission timing offset for a cell in an NTN, transmit, to the UE, an RRC message including a second indication of a second transmission timing offset that is based on an RTT for communications between the UE and the cell in the NTN, and receive, from the UE, an uplink message based on the second transmission timing offset.

Some examples of the method, apparatuses, and non-transitory computer-readable medium described herein may further include operations, features, means, or instructions for receiving, from the UE, a RACH message based on the first transmission timing offset, and establishing an RRC connection with the UE based on the RACH message, where the RRC message may be transmitted based on the RRC connection. Some examples of the method, apparatuses, and non-transitory computer-readable medium described herein may further include operations, features, means, or instructions for identifying an RNTI associated with the system information message, where the first transmission timing offset associated with the RACH message may be based on the RNTI.

Some examples of the method, apparatuses, and non-transitory computer-readable medium described herein may further include operations, features, means, or instructions for determining the second transmission timing offset based on a TA and a differential offset associated with the UE, where the RACH message includes a third indication of the TA and the differential offset. Some examples of the method, apparatuses, and non-transitory computer-readable medium described herein may further include operations, features, means, or instructions for determining the RTT for communications between the UE and the cell of the NTN, where the TA and the differential offset may be based on the RTT.

In some examples of the method, apparatuses, and non-transitory computer-readable medium described herein, the second transmission timing offset may be based on the third indication of the TA and the differential offset. Some examples of the method, apparatuses, and non-transitory computer-readable medium described herein may further include operations, features, means, or instructions for identifying an RNTI associated with a DCI message, and transmitting, to the UE, the DCI message including a grant for the uplink message, where the second transmission timing offset associated with the uplink message may be based on the RNTI.

Some examples of the method, apparatuses, and non-transitory computer-readable medium described herein may further include operations, features, means, or instructions for transmitting a DCI message including a grant for a downlink shared channel message, where the uplink message includes ACK feedback for the downlink shared channel message. Some examples of the method, apparatuses, and non-transitory computer-readable medium described herein may further include operations, features, means, or instructions for determining the second transmission timing offset based on adding the first transmission timing offset and a negative offset, where the second indication includes the negative offset.

In some examples of the method, apparatuses, and non-transitory computer-readable medium described herein, the receiving of the uplink message based on the second transmission timing offset may include operations, features, means, or instructions for determining an uplink slot for reception of the uplink message based on the second transmission timing offset and a downlink slot associated with a DCI message corresponding to the uplink message, where the uplink message may be received based on the uplink slot.

A method of wireless communication at a base station is described. The method may include transmitting, to a UE, a first DCI message scheduling a first uplink message associated with a HARQ process, transmitting, to the UE, a second DCI message scheduling a second uplink message associated with the HARQ process, and receiving, from the UE, the first uplink message after transmitting the second DCI message.

An apparatus for wireless communication at a base station is described. The apparatus may include a processor, memory coupled with the processor, and instructions stored in the memory. The instructions may be operable, when executed by the processor, to cause the apparatus to transmit, to a UE, a first DCI message scheduling a first uplink message associated with a HARQ process, transmit, to the UE, a second DCI message scheduling a second uplink message associated with the HARQ process, and receive, from the UE, the first uplink message after transmitting the second DCI message.

Another apparatus for wireless communication at a base station is described. The apparatus may include means for transmitting, to a UE, a first DCI message scheduling a first uplink message associated with a HARQ process, transmitting, to the UE, a second DCI message scheduling a second uplink message associated with the HARQ process, and receiving, from the UE, the first uplink message after transmitting the second DCI message.

A non-transitory computer-readable medium storing code for wireless communication at a base station is described. The code may include instructions executable by a processor to transmit, to a UE, a first DCI message scheduling a first uplink message associated with a HARQ process, transmit, to the UE, a second DCI message scheduling a second uplink message associated with the HARQ process, and receive, from the UE, the first uplink message after transmitting the second DCI message.

Some examples of the method, apparatuses, and non-transitory computer-readable medium described herein may further include operations, features, means, or instructions for determining that the HARQ process may be associated with a single transmission attempt, where the second DCI message may be transmitted prior to the receiving of the first uplink message based on the determining that the HARQ process may be associated with the single transmission attempt.

Some examples of the method, apparatuses, and non-transitory computer-readable medium described herein may further include operations, features, means, or instructions for determining that the first uplink message and the second uplink message may be associated with a same TB, where the second DCI message may be transmitted prior to the receiving of the first uplink message based on the determining that the first uplink message and the second uplink message may be associated with a same TB. In some examples of the method, apparatuses, and non-transitory computer-readable medium described herein, a time duration between the first uplink message and the second uplink message includes a separation threshold. In some examples of the method, apparatuses, and non-transitory computer-readable medium described herein, a time duration between the first DCI message and the second DCI message includes a separation threshold.

In some examples of the method, apparatuses, and non-transitory computer-readable medium described herein, the separation threshold includes a quantity of slots or a quantity of symbols. In some examples of the method, apparatuses, and non-transitory computer-readable medium described herein, the separation threshold may be based on a numerology. In some examples of the method, apparatuses, and non-transitory computer-readable medium described herein, the second DCI message may be transmitted within a time interval prior to the transmitting of the first uplink message. In some examples of the method, apparatuses, and non-transitory computer-readable medium described herein, the time interval may be based on a transmission timing offset and a TA associated with the transmitting of the first uplink message.

Some examples of the method, apparatuses, and non-transitory computer-readable medium described herein may further include operations, features, means, or instructions for receiving a first indication of a first quantity of supported HARQ processes based on a capability of the UE, and transmitting a second indication of a second quantity of HARQ processes based on the first indication of the first quantity of supported HARQ processes, where an ID of the HARQ process may be based on the second quantity of HARQ processes. In some examples of the method, apparatuses, and non-transitory computer-readable medium described herein, the second quantity of HARQ processes may be based on one or more of a TA associated with the transmitting of the first uplink message, a numerology, and a differential offset associated with the UE.

In some examples of the method, apparatuses, and non-transitory computer-readable medium described herein, the second quantity of HARQ processes may be based on an NTN cell. Some examples of the method, apparatuses, and non-transitory computer-readable medium described herein may further include operations, features, means, or instructions for transmitting a downlink shared channel message based on a grant, where the first DCI message includes the grant and where the first uplink message includes ACK feedback for the downlink shared channel message.

DETAILED DESCRIPTION

Figure 1:
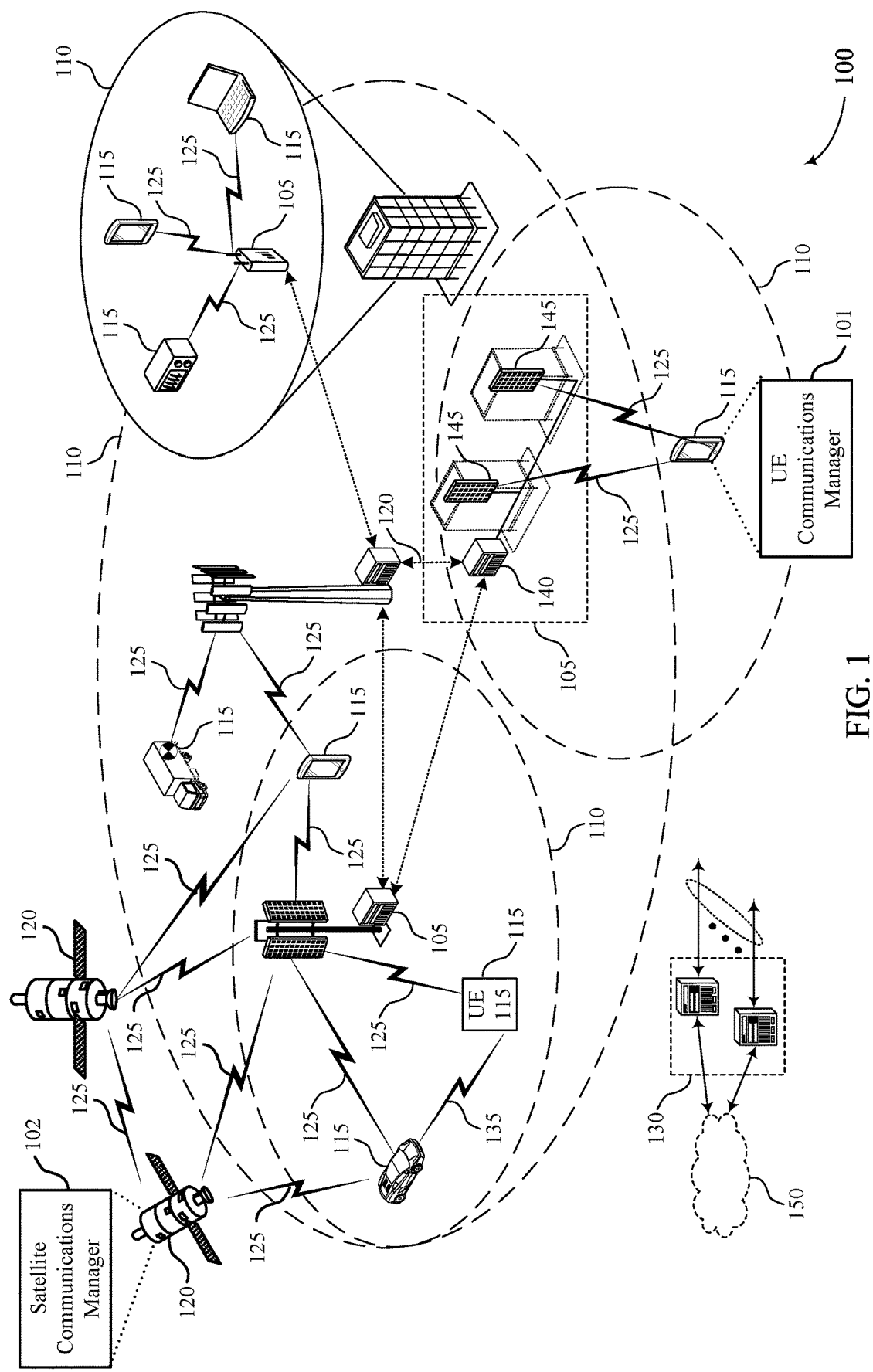
FIG. 1 illustrates an example of a wireless communications system that supports improved data channel timelines in wireless communications systems in accordance with aspects of the present disclosure.

Non-terrestrial networks (NTNs) may provide coverage by using high-altitude vehicles between user terminals and gateways or base stations (e.g., next-generation NodeBs or giga-NodeBs, which may be referred to as a gNB, and also referred to as access stations or access gateways). A gateway may, for example, transmit data to a satellite, which may then relay the data to a user terminal or vice-versa. A high-altitude vehicle itself may be a base station, in some examples. A user terminal may be any device capable of transmitting signals to a satellite. Examples of a user terminal may include a user equipment (UE), a relay equipment configured to relay a signal between a satellite and a user terminal, or a combination thereof. NTNs may involve the use of high altitude platform stations (HAPSs) (sometimes referred to as satellites) to provide coverage for terrestrial base stations and UEs. The terms HAPS and satellite may be used interchangeably herein to refer to a remote NTN device that may provide coverage to one or more other high altitude or terrestrial devices. Likewise, the terms gateway and base station may be used interchangeably herein to refer to a network node that serves a UE and provides network access to the UE. In some cases, the base station (e.g., a gNB) may be itself on the satellite, or the functionality of the base station may be split between the satellite and the gateway (e.g., the satellite may be a distributed unit (DU) and the gateway a central unit (CU), or other architectures). One or more aspects of the techniques described herein may be applicable in scenarios where the gNB is on the gateway, the satellite, or split among gateway and satellite.

In some cases, the gateway and the satellite may be thousands of kilometers apart and it may take some time for electromagnetic waves to propagate over the distance between the gateway and the satellite and between the satellite and the user terminal. Thus, the propagation delay for NTNs may be many orders of magnitude larger than the propagation delay for terrestrial networks. As such, the round trip delay (RTD), which may sometimes be referred to as a round trip time (RTT), associated with a signal may also be orders of magnitude larger for NTNs than for terrestrial networks. Further, some high-altitude vehicles (such as non-geostationary satellites) may be associated with high mobility, and communications with such high mobility high-altitude vehicles may promote or otherwise experience large and time-varying RTDs. These variation in RTD may affect user terminals to experience variation in uplink timing and frequency synchronization with satellites.

Further, some wireless communications systems may support retransmissions of data to increase the likelihood that data is received successfully. Hybrid automatic repeat request (HARQ) feedback is one technique for increasing the likelihood that data is received correctly over a communication link. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

It may be desirable for wireless communications systems to support improved feedback techniques that account for RTD, as well as variation in RTD across UEs in a cell, associated with NTNs. For instance, wireless communications systems may implement a quantity of HARQ processes for communications between wireless devices. A satellite in an NTN may manage or track communications with a UE via one or more HARQ processes identifiers (IDs). In some examples, HARQ process IDs may be specifically tied to an uplink or downlink communication (e.g., such that a satellite may track uplink or downlink communications with a UE via HARQ process IDs). For example, some systems may specify that downlink control information (DCI) may not include (or schedule physical uplink shared channel (PUSCH) transmissions associated with) a HARQ process ID that is associated with a previously scheduled PUSCH that has not yet been performed or conducted by a UE.

As such, a quantity of implementable HARQ process IDs may be limited, which may impact a scheduling of uplink and downlink communications in wireless communications systems (e.g., such as NTNs) associated with large propagation delays and varying frame timing of different UEs. In other words, a satellite may use HARQ process IDs for communications with a UE in an NTN and, because of large RTDs, UEs may not transmit responses (e.g., PUSCH or HARQ acknowledgement (ACK) associated with a HARQ process ID) to the satellite until after the satellite runs out of HARQ process IDs (e.g., and the satellite may, in some cases, not reuse a HARQ process ID for two outstanding communications that have been scheduled but have not yet been performed by the UE).

According to the techniques described herein, timing enhancements and HARQ process enhancements may be employed by an NTN to account for such large propagation delays and varying frame timing of different UEs within the NTN. In some cases, a scheduling offset ($K_{offset}$) between a UE's uplink and downlink radio frame timing structure may be updated (e.g., once the UE is in a radio resource control (RRC) connected mode) to provide for more efficient utilization of HARQ processes. For instance, uplink and downlink radio frame timing structures at the UE and at the satellite (or gateway) may be offset by some scheduling offset ($K_{offset}$) to account for propagation delay and propagation delay variation between UEs in a cell. According to the described techniques, a UE within close proximity to a satellite, relative to other UEs within the cell, may be configured with an updated (e.g., reduced) scheduling offset such that scheduling delays may be reduced and thus HARQ processes may be reused more rapidly (e.g., without a satellite reusing a HARQ process ID for two scheduled communications that have not yet been performed by the UE).

Additionally or alternatively, wireless communications systems may define one or more separation distances (e.g., or timing thresholds) for timing between communications and HARQ processes may be reused based on the separation distance threshold (e.g., such that a satellite may reuse a HARQ process ID for two scheduled communications that have not yet been performed by the UE). For instance, a separation distance between two uplink communications may be defined and a HARQ process may be reused for scheduling the two uplink communications (e.g., where the latter uplink communication may be scheduled prior to the UE performing the first uplink communication).

Particular aspects of the subject matter described herein may be implemented to realize one or more potential advantages. The described techniques may support improved feedback and retransmission mechanisms for communications between a base station or satellite and one or more UEs served by the base station or satellite. For instance, the described techniques may provide for increased throughput and efficient HARQ process management for communications between high-altitude vehicles (e.g., satellites or other non-terrestrial-based equipment), user terminals, and gateways, in NTNs. As such, supported techniques may include features for efficient NTNs and efficient non-terrestrial communications. Improved HARQ management described herein may provide for reduced latency (e.g., associated with HARQ process ID management techniques in some terrestrial networks) via reduced scheduling delay for UEs with relatively less RTD or via efficient reuse of HARQ process IDs. In some aspects, the described techniques may also support increased spectral efficiency in NTNs, among other advantages.

Aspects of the disclosure are initially described in the context of wireless communications systems. Aspects of the disclosure are also illustrated by example frame timing diagrams and example process flow diagrams. Aspects of the disclosure are further illustrated by and described with reference to apparatus diagrams, system diagrams, and flowcharts that relate to improved data channel timelines in wireless communications systems.

FIG. 1 illustrates an example of a wireless communications system 100 that supports improved data channel timelines in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links (e.g., via an S1, N2, N3, or other interface). The base stations 105 may communicate with one another over the backhaul links (e.g., via an X2, Xn, or other interface) either directly (e.g., directly between base stations 105), or indirectly (e.g., via core network 130), or both. In some examples, the backhaul links may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 includes base stations 105, UEs 115, satellites 120, and a core network 130. In some examples, the wireless communications system 100 may be an LTE network, an LTE-A network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Wireless communications system 100 may also include one or more satellites 120. A satellite 120 may communicate with one or more base stations 105 (also referred to as gateways in NTNs) and one or more UEs 115 (or other high altitude or terrestrial communications devices). The satellite 120 may be any suitable type of communication satellite configured to relay communications between different end nodes in the wireless communications system 100. The satellite 120 may be an example of a space satellite, a balloon, a dirigible, an airplane, a drone, an unmanned aerial vehicle, or the like. In some examples, the satellite 120 may be in a geosynchronous or geostationary earth orbit (GEO), a low earth orbit (LEO) or a medium earth orbit (MEO). The satellite 120 may be a multi-beam satellite configured to provide service for multiple service beam coverage areas in a predefined geographical service area. The satellite 120 may be any distance away from the surface of the earth.

In some cases, a cell may be provided or established by a satellite 120 as part of an NTN. A satellite 120 may, in some cases, perform the functions of a base station 105, act as a bent-pipe satellite, or may act as a regenerative satellite, or a combination thereof. In some other cases, a satellite 120 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite may receive a signal from a base station 105 and may relay the signal to a UE 115 or base station 105, or vice-versa.

UEs 115 may communicate with satellites 120 or base stations 105 (or gateways) using communication links 125. NTNs (e.g., such as the wireless communications system 100) may employ a scheduling offset ($K_{offset}$) for uplink and downlink radio frame timing structures to efficiently account for propagation delay and propagation delay variation associated with communications in the NTN. Further, UEs 115 may determine timing advance (TA) values to be applied to uplink transmissions based on their respective scheduling offset ($K_{offset}$), as well as based on propagation delay or RTT (e.g., which may be determined by the UE 115 or indicated via satellite 120 signaling). As such, in some cases, served UEs 115 may determine uplink timing such that uplink transmissions from the UEs 115 to a satellite 120 arrive at the satellite 120 in a time synchronized manner (e.g., such that communications from two or more UEs 115 scheduled in a same downlink time slot arrive at a same corresponding uplink time slot from the perspective of the satellite 120).

The UEs 115 and the base stations 105/satellites 120 may support retransmissions of data to increase the likelihood that data is received successfully. HARQ feedback is one technique for increasing the likelihood that data is received correctly over a communication link 125. HARQ may include a combination of error detection (e.g., using a CRC), FEC, and retransmission (e.g., ARQ). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A UE 115 may include a UE communications manager 101 (e.g., which may be an example of a communications manager 815 described herein). The UE communications manager 101 may receive a system information message including a first indication of a first transmission timing offset for a cell in an NTN, and receive an RRC message including a second indication of a second transmission timing offset, where the second transmission timing offset is less than the first transmission timing offset. The UE communications manager 101 may transmit an uplink message based on the second transmission timing offset.

The UE communications manager 101 may also receive a first DCI message scheduling a first uplink message associated with a HARQ process, and receive, based on a separation threshold associated with communications between the UE and a cell in an NTN, a second DCI message scheduling a second uplink message associated with the HARQ process. The UE communications manager 101 may transmit the first uplink message after receiving the second DCI message A satellite 120 (e.g., or in some examples a base station 105) may include a satellite communications manager 102 (e.g., which may be an example of a communications manager 1215 described herein). The satellite communications manager 102 may transmit, to a UE 115, a system information message including a first indication of a first transmission timing offset for a cell in an NTN. The satellite communications manager 102 may transmit, to the UE 115, an RRC message including a second indication of a second transmission timing offset that is based on an RTT for communications between the UE and the cell in the NTN, where the second transmission timing offset is less than the first transmission timing offset. The satellite communications manager 102 may receive, from the UE 115, an uplink message based on the second transmission timing offset.

The satellite communications manager 102 may also transmit, to a UE 115, a first DCI message scheduling a first uplink message associated with a HARQ process. The satellite communications manager 102 may transmit, to the UE 115 based on a separation threshold associated with communications between the UE 115 and a cell in an NTN, a second DCI message scheduling a second uplink message associated with the HARQ process. The satellite communications manager 102 may receive, from the UE 115, the first uplink message after transmitting the second DCI message.

Figure 2:
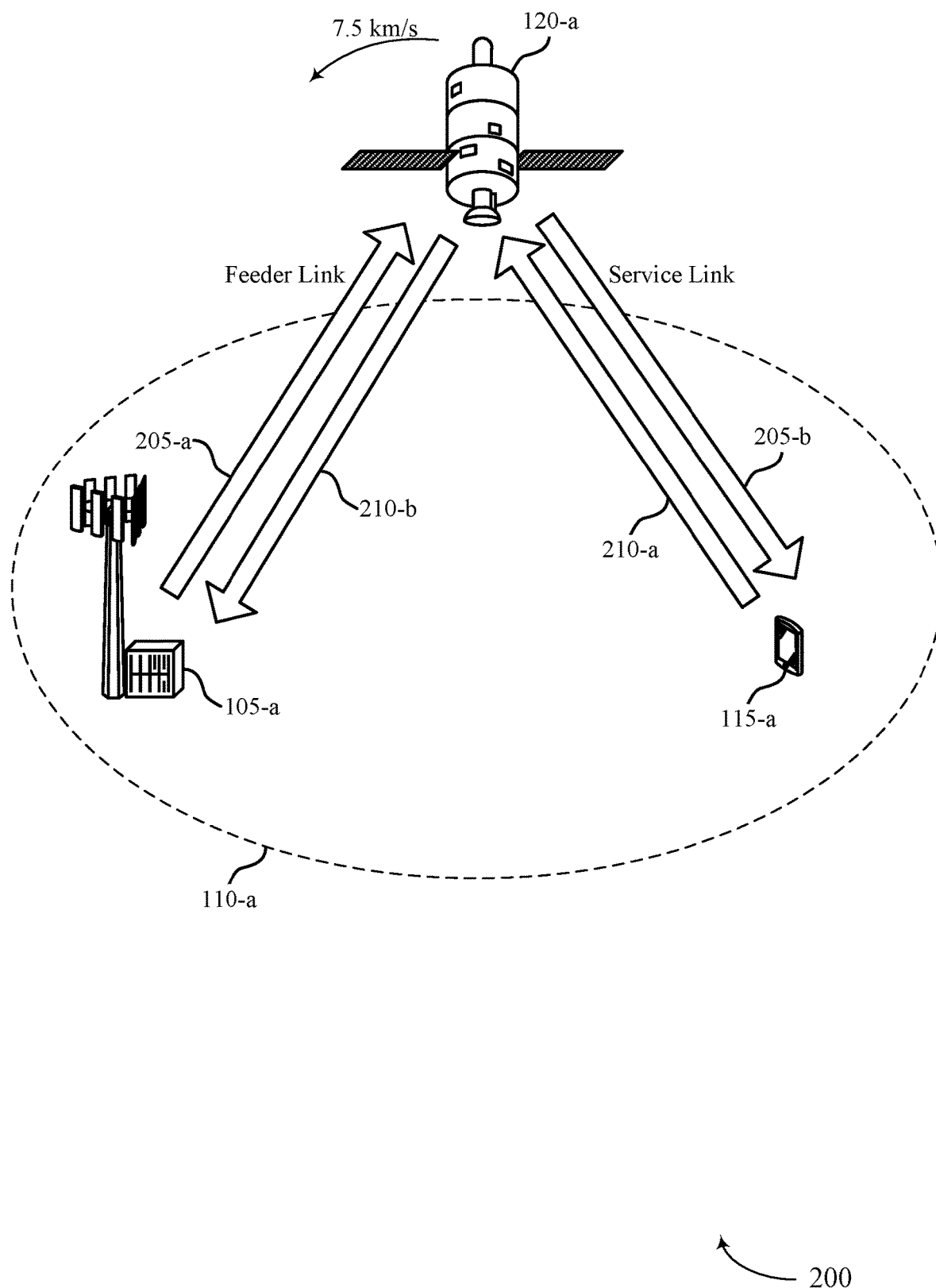
FIG. 2 illustrates an example of a wireless communications system that supports improved data channel timelines in wireless communications systems in accordance with aspects of the present disclosure.

FIG. 2 illustrates an example of a wireless communications system 200 that supports improved data channel timelines in wireless communications systems in accordance with aspects of the present disclosure. In some examples, the wireless communications system 200 may implement aspects of the wireless communications system 100. For example, the wireless communications system 200 may include a gateway (such as a base station 105-a), a UE 115-a, and a satellite 120-a (e.g., which in some cases may also be referred to as a base station 105), which may be examples of a base station 105, a UE 115, and a satellite 120 as described with reference to FIG. 1. The gateway base station 105-a may serve a coverage area 110-a in cases of a terrestrial network, and the satellite 120-a may serve the coverage area 110-a in cases of an NTN.

In some examples, the satellite 120-a may relay communications between the gateway (e.g., the base station 105-a) and the UE 115-a. For example, the gateway or base station 105-a may communicate with the UE 115-a via the satellite 120-a or vice-versa. In some examples, for communications originating at the gateway and going to the UE 115-a, the gateway may transmit an uplink transmission 205-a to the satellite 120-a, which in some cases may be referred to as a feeder link. The satellite 120-a may relay the uplink transmission 205-a as a downlink transmission 205-b to the UE 115-a, which in some cases may be referred to as a service link. In some other examples, for communications originating at the UE 115-a and going to the gateway 105-a, the UE 115-a may transmit an uplink transmission 210-a to the satellite 120-a via the service link. The satellite 120-a may relay the uplink transmission 210-a as a downlink transmission 210-b to the gateway via the feeder link.

In some cases, the satellite 120-a may be thousands of kilometers apart from the gateway or the UE 115-a and it may take some time for electromagnetic waves to propagate over the distance between the gateway and the satellite 120-a and between the satellite 120-a and the UE 115-a. The propagation delay for NTNs may be many orders of magnitude larger than the propagation delay for terrestrial networks. As such, the RTD (e.g., communication delay due to RTT associated with signal propagation) associated with a transmission may also be orders of magnitude larger for NTNs than for terrestrial networks. In addition, high speeds of geostationary satellites, for example, (such as the satellite 120-a) may promote variation in RTD. As a result, the UE 115-a may experience variation in uplink timing synchronization with the satellite 120-a. Likewise, the gateway may experience variation in uplink and downlink timing synchronization with the satellite 120-a. Thus, in some examples, a total propagation delay may be comprised of a first portion of the propagation delay and a first propagation delay variation for the UE-to-satellite link, and a second portion of the propagation delay and a second propagation delay variation for the satellite-to-gateway link. In some cases, RTD information includes a satellite-to-gateway propagation delay, the UE 115-a may determine a UE-to-satellite propagation delay for use in an initial access procedure, and the propagation delay variation may be determined subsequent to the initial access procedure.

By way of example, the satellite 120-a may be in an orbit, such as an LEO, an MEO, or other non-geostationary earth orbit. In any of these examples, the satellite 120-a may be many thousands of kilometers from earth, and therefore may be thousands of kilometers from the gateway and the UE 115-a. The transmission 205 or the transmission 210 between the gateway and the UE 115-a may therefore travel from earth the distance to the satellite 120-a and back to earth. The distance that a transmission travels may increase the propagation delay of a transmission or RTD associated with the transmission. The propagation delay may refer to a duration it takes for a signal to travel from its source to its intended recipient. The RTD may refer to a duration (e.g., an RTT) it takes for a transmission to be transmitted from a source to its intended recipient, processed by the intended recipient, and a response transmitted from the intended recipient of the transmission back to the source.

The UE 115-a may support a closed-loop timing control to maintain an uplink timing synchronization (or uplink timing accuracy) with the satellite 120-a, or with the gateway 105-a. The UE 115-a, in some examples, may rely on network signaled RTD information or an RTD variation rate (of a beam center of the satellite 120-a) if the UE 115-a is unable to determine its geolocation within the geographic coverage area 110-a. If the satellite 120-a is in a low-earth orbit, the satellite 120-a may be between 600 km to 2000 km from earth and travelling at a rate of approximately 7.5 km/s. In the example of an LEO location of the satellite 120-a, for example, such as a 1200 km orbit from earth with an elevation angle of 30°, the RTD variation rate may be on the order of 35 microseconds (µs) per second (s) (µs/s).

In order to provide synchronized uplink and downlink timing at the gateway, communications to and from the gateway may be made according to a gateway timing reference. In order to provide synchronized uplink and downlink timing at the satellite 120-a, communications to and from the satellite 120-a may be made according to a satellite timing reference. In order to provide synchronized uplink and downlink timing at the UE 115-a, communications to and from the UE 115-a may be made according to a UE timing reference. In some examples, uplink and downlink timing may be synchronized at the satellite 120-a (e.g., via implementation of a scheduling offset $K_{offset}$). In some other examples, uplink and downlink timing may be synchronized at each UE 115 (e.g., where $K_{offset}=0$).

For instance, in cases in which uplink and downlink timing is synchronized at the gateway, the UE 115-a may adjust a timing of uplink communications to the gateway such that the uplink communication is transmitted far enough in advance of a timing boundary or frame boundary at the gateway to have a time of arrival at the gateway that corresponds to the timing boundary or frame boundary. In other cases, the UE 115-a may use the satellite timing reference for uplink communications to provide that uplink communications are received at the satellite 120-a at a desired time or frame boundary.

Figure 3A:
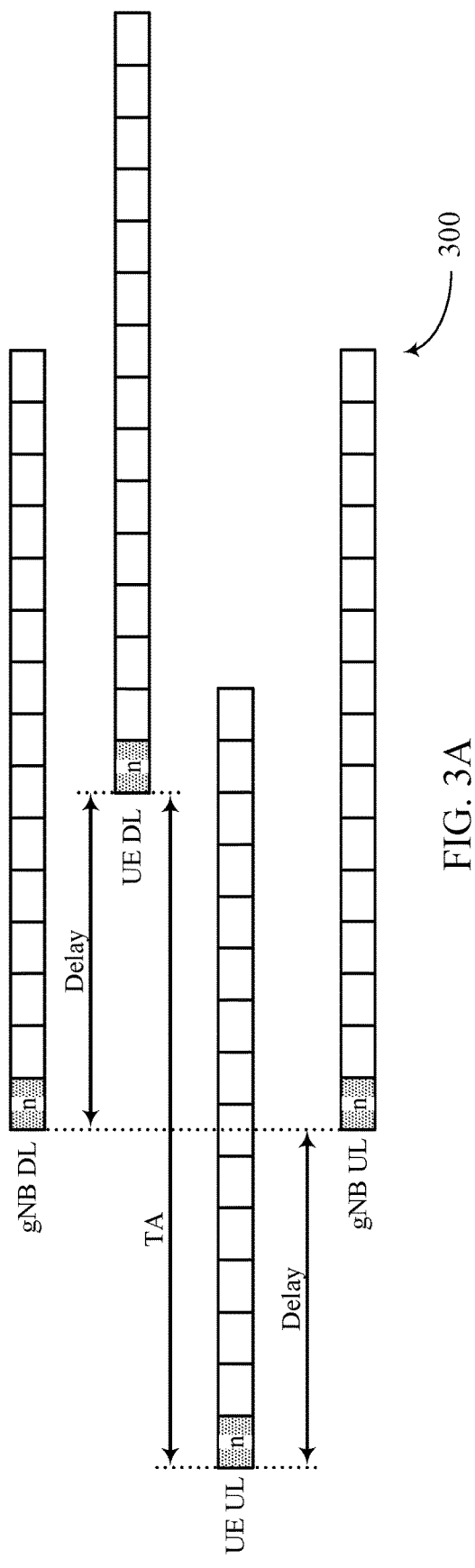
FIGS. 3A and 3B illustrate examples of frame timing diagrams that support improved data channel timelines in wireless communications systems in accordance with aspects of the present disclosure.
Figure 3B:
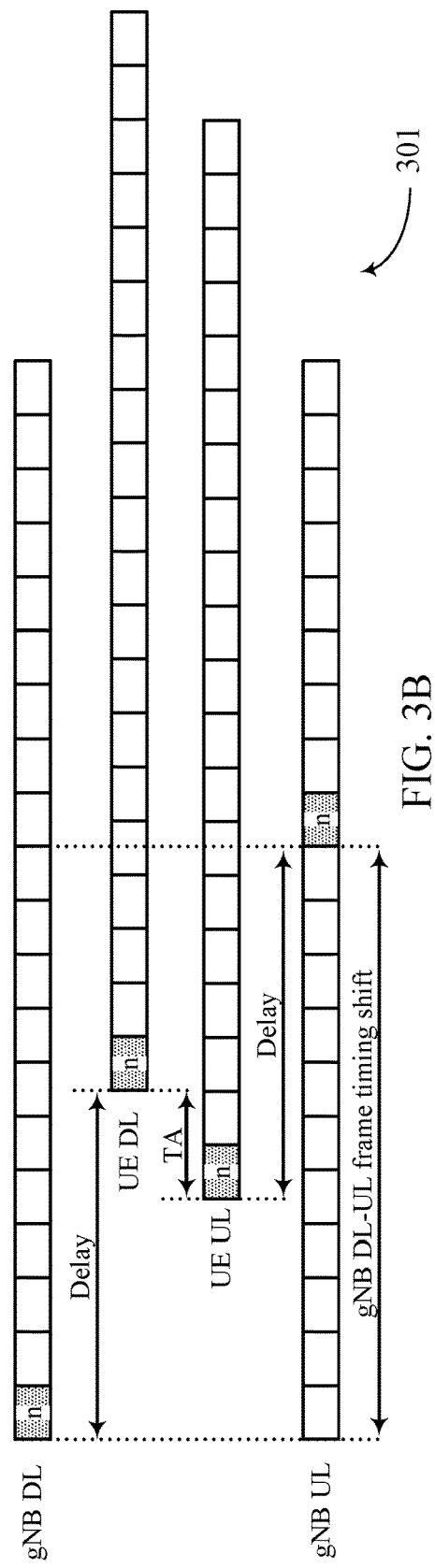

FIG. 3A and FIG. 3B illustrate examples of frame timing diagram 300 and frame timing diagram 301, respectively, that each support timing improvements for NTNs in accordance with one or more aspects of the present disclosure. In some examples, the frame timing diagram 300 or the frame timing diagram 301 may implement or be implemented to realize aspects of the wireless communications system 100 or the wireless communications system 200. For example, the frame timing diagram 300 or the frame timing diagram 301 may be based on a configuration by a gateway (such as a base station 105 or a satellite 120), and implemented by a UE 115 for estimating and determining uplink timing (or implemented by a satellite 120 for estimating and determining downlink timing) in an NTN, as described with reference to FIGS. 1 and 2. Generally, FIG. 3A and FIG. 3B may illustrate one or more aspects that may allow network frameworks (e.g., NTNs) to define timing relationships at a base station (such as a gNB, which may refer to a gateway or a satellite) and a UE.

In the example frame timing diagrams illustrated by FIGS. 3A, 3B, 4, and 5, gNB timing may illustrate one or more aspects of a radio frame timing structure for a gateway or satellite. For example, gNB downlink (DL) timing may illustrate one or more aspects of a downlink radio frame timing structure for a gateway or satellite, and gNB uplink (UL) timing may illustrate one or more aspects of an uplink radio frame timing structure for a gateway or satellite. Further, UE timing may illustrate one or more aspects of a radio frame timing structure for a UE. For example, UE DL timing may illustrate one or more aspects of a downlink radio frame timing structure for a UE, and UE UL timing may illustrate one or more aspects of an uplink radio frame timing structure for a UE. gNB timing and UE timing may be associated with boundaries such as slot boundaries, frame or subframe boundaries, etc. In some cases, gNB timing and UE timing may have a quantity of frame boundaries that correspond to slots or SFNs.

FIG. 3A may illustrate a large TA in an NTN that may result in a large offset in the UEs downlink frame timing and uplink frame timing. For instance, in the frame timing diagram 300, gNB DL timing and gNB UL timing may be aligned (e.g., a gNB downlink frame n may be aligned with corresponding gNB uplink frame n). UE DL timing may lag the gNB timing (gNB DL timing) by an amount of propagation delay between the UE and the gNB (e.g., which may include a UE-to-satellite propagation delay or both a UE-to-satellite propagation delay and a satellite-to-gateway propagation delay). In order to provide uplink communications that are received at the gNB and synchronized with gNB SFN or slot boundaries, UE UL timing may have each corresponding SFN or slot advanced ahead of the UE DL timing by an amount of the TA (e.g., which may correspond to an RTT or RTD). In other words, uplink and downlink radio frame timing structures of the UE may be offset such that a UE downlink frame n may be shifted compared to a UE uplink frame n by a TA. As described herein, in some cases, UEs may thus transmit uplink communications with relatively large TAs in NTNs (e.g., TAs on the order of hundreds of milliseconds (ms)).

Alternatively, if a smaller TA is used, gNB DL timing and gNB UL timing may not be aligned. For example, FIG. 3B may illustrate a reduced TA in an NTN that may result in a large offset in the gNBs downlink frame timing and uplink frame timing. For instance, in the frame timing diagram 301, gNB DL timing and gNB UL timing may be offset (e.g., a gNB downlink frame n may be offset from a corresponding gNB uplink frame n by a gNB DL-UL frame timing shift). UE DL timing may lag the gNB timing (gNB DL timing) by an amount of propagation delay between the UE and the gNB (e.g., which may include a UE-to-satellite propagation delay or both a UE-to-satellite propagation delay and a satellite-to-gateway propagation delay). In order to provide uplink communications that are synchronized with UE SFN or slot boundaries, UE UL timing may have each corresponding SFN or slot advanced ahead of the UE DL timing by an amount of the TA.

Figure 4:
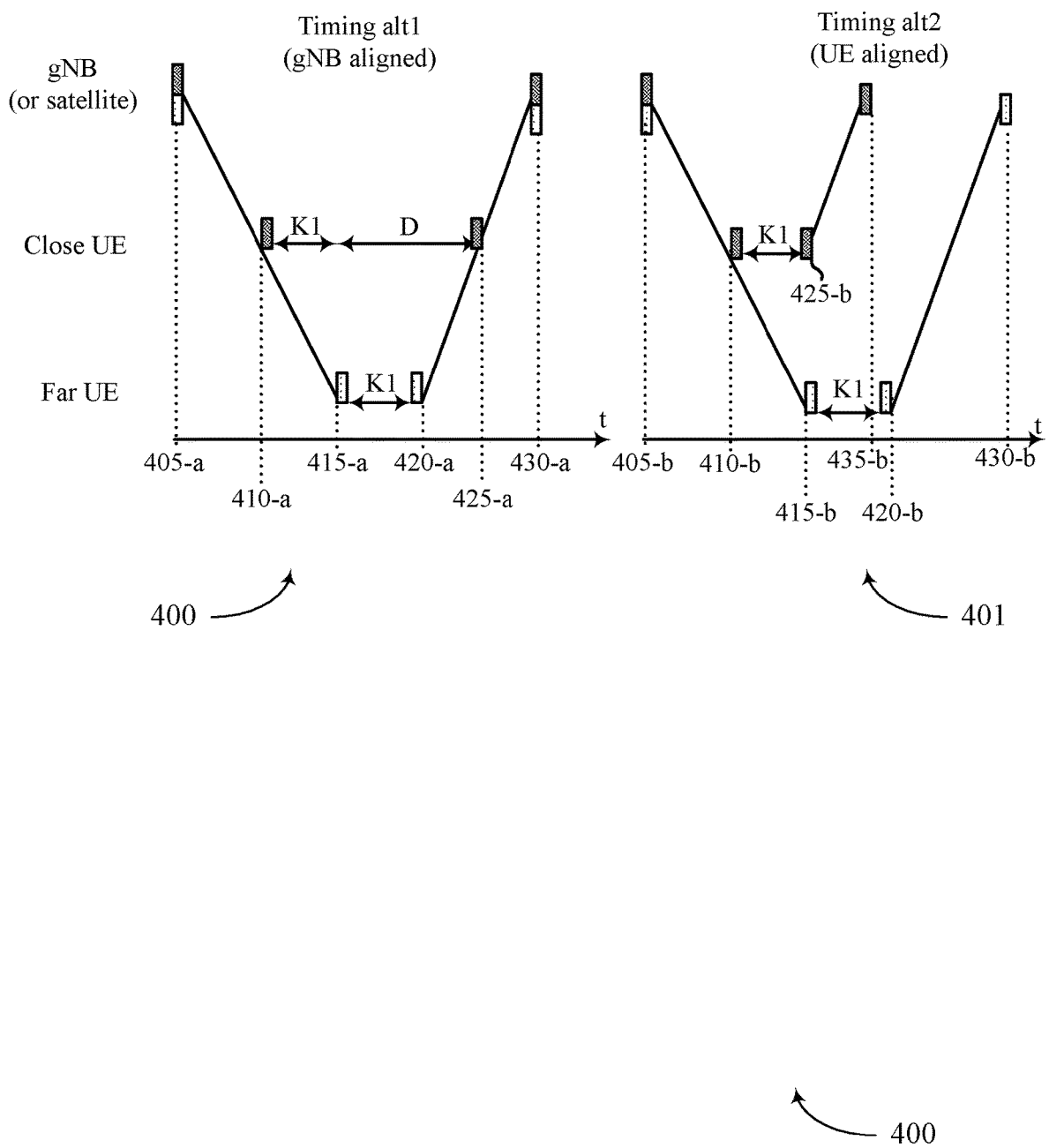
FIG. 4 illustrates example timing diagrams that support improved data channel timelines in wireless communications systems in accordance with aspects of the present disclosure.

FIG. 4 illustrates an example of a timing diagram 400 and a timing diagram 401 that support timing improvements for NTNs in accordance with one or more aspects of the present disclosure. In some examples, the timing diagram 400 or timing diagram 401 may implement or be implemented to realize aspects of the wireless communications system 100, the wireless communications system 200, the frame timing diagram 300, or the frame timing diagram 301. For example, the timing diagram 400 or the timing diagram 401 may be based on a configuration by a gateway (or base station 105 or a satellite 120), and implemented by a UE 115 for estimating and determining uplink timing (or implemented by a satellite 120 for estimating and determining downlink timing) in an NTN, as described with reference to FIGS. 1-3. Generally, FIG. 4 may illustrate one or more aspects that may allow network frameworks (e.g., NTNs) to define timing relationships at a base station (gNB, which may refer to a gateway or a satellite) and a UE.

Generally, NTNs may employ one of two high level alternatives. In gNB time (e.g., from the timing perspective of a satellite, a base station, a gateway, etc.), transmissions from two UEs scheduled in the same instant (e.g., in the same downlink frame) with a same offset (K) may be received at the same time (e.g., in a same uplink frame corresponding to the scheduling downlink frame), or transmissions from two UEs scheduled in the same instant (e.g., in the same downlink frame) with a same offset (K) may be received at different times (e.g., in different uplink frames due to differences in RTTs between the two UEs scheduled via the same downlink frame). Various aspects of the discussed timing enhancements may be described with reference to a scheduling offset ($K_{offset}$), a worst case RTT (N), a difference between the worst case RTT and the best case RTT (D), and an estimated RTT at a UE X ($N_x$). In some cases, the estimated RTT at a UE X ($N_x$) may be referred to as a UE-specific RTT. For example, the estimated RTT at a worst case UE (e.g., which may correspond to a UE farthest from the gNB, a UE moving away from the gNB, etc.) would be $N_x$=N, and the estimated RTT at a best case UE (e.g., where the best case RTT may correspond to a UE closest to the gNB, a UE moving towards the gNB, etc.) would be $N_x$=N−D.

The timing diagram 400 may illustrate the first alternative described above in which timing is aligned at the gNB (e.g., such that a same RTT is observed by the gNB for a close UE and a far UE). For example, a gNB may transmit DCI (e.g., included in physical downlink control channel (PDCCH) signaling) at 405-*a*. The DCI may schedule two UEs (a 'Close UE' and a 'Far UE') for uplink transmission (e.g., for PUSCH signaling, which may be scheduled via an uplink grant in DCI). The close UE may receive the downlink message at 410-*a* and the far UE may receive the downlink message at 415-*a* (e.g., due to differences in RTT associated with the two UEs). For example, due to proximity with a gNB in an NTN, a close UE and a far UE may have differences in RTTs (e.g., such as RTTs differing by 10 ms or more) that may be significant (e.g., relative to radio frame timing at the gNB and UEs).

Both UEs may be scheduled to transmit a corresponding uplink message after some K1 slots (e.g., where K1 may be some scheduling offset configured by the network), and the close UE may delay transmission of the uplink message by an additional duration D such that both uplink messages may be received at the gNB at the same time (at 430-*a*). As such, a far UE may transmit an uplink message (e.g., corresponding to the downlink message received at 415-*a*) at 420-*a*, and a close UE may transmit an uplink message (e.g., corresponding to the downlink message received at 410-*a*) at 425-*a*. Due to the differences in RTT for uplink transmission by the close UE and the far UE, and due to the additional delay (D) employed by the close UE, uplink messages corresponding to the downlink scheduling (transmitted by the gNB at 405-*a*) may be received by the base station at a same time (e.g., at 430-*a*).

Alternatively, the timing diagram 401 may illustrate the second alternative described above in which timing is aligned at the UEs (e.g., such that different RTTs are observed by the gNB for a close UE and a far UE). For example, a gNB may transmit DCI (e.g., via PDCCH signaling) at 405-*b*. The DCI may schedule two UEs (a 'Close UE' and a 'Far UE') for uplink transmission (e.g., for PUSCH signaling, which may be scheduled via an uplink grant in DCI). The close UE may receive the downlink message at 410-*b* and the far UE may receive the downlink message at 415-*b* (e.g., due to differences in RTT associated with the two UEs). For example, due to proximity with a gNB in an NTN, a close UE and a far UE may have differences in RTTs (e.g., such as RTTs differing by 10 or more ms) that may be significant (e.g., relative to radio frame timing at the gNB and UEs).

Both UEs may be scheduled to transmit a corresponding uplink message after some K1 slots (e.g., where K1 may be some scheduling offset configured by the network). As such (e.g., in cases in which the close UE does not delay transmission of the uplink message by an additional duration D), the close UE may transmit an uplink message (e.g., corresponding to the downlink message received at 410-*b*) at 425-*b* and the far UE may transmit an uplink message (e.g., corresponding to the downlink message received at 415-*b*) at 420-*b*. Thus, and due to the differences in RTT for downlink reception of a scheduling grant and for uplink transmission by the close UE and the far UE, uplink messages corresponding to the downlink scheduling (transmitted by the gNB at 405-*a*) may be received by the base station at different times (e.g., uplink corresponding to the scheduled close UE may be received at 435-*b* and uplink corresponding to the scheduled far UE may be received at 430-*b*).

In cases in which the gNB timing reference is used for determination of uplink timing (e.g., such as for the determination of D or the determination of the uplink time 425-*a*), the one way propagation delay may correspond to the delay between the UE and the gNB (e.g., which may include delay between the UE and the satellite (UE-satellite delay) or both the UE-satellite delay plus satellite-gateway delay). In some examples, such as in examples in which the UE has a global navigation satellite system (GNSS) capability, the UE may be able to estimate the propagation delay. In cases in which satellite reference timing is used, the feeder link may be aligned according to a satellite clock, and the gateway may adjust its transmit timing to compensate for delay between the satellite and the gateway, and thus the UE may avoid considering timing variation of the service link due to satellite movement relative to gateway.

In cases in which the UE uses the gNB timing reference, when the UE receives uplink scheduling (e.g., in DCI of a downlink message from the gNB), the UE may determine the uplink timing according to the received downlink signal timing plus a TA, plus a scheduling offset ($K_{offset}$ (e g in addition to the K1 offset or K2 offset). In some cases, the gNB or other network node may broadcast information about RTD (e.g., to be used in initial access, such as for a random access procedure). In some cases, the gNB may broadcast the RTD between the satellite and the UE. In some cases, the UE may determine the RTD between the UE and the satellite based on one or more of a GNSS capability of the UE, ephemeris information associated with the satellite, information provided by gateway (e.g., in broadcast or unicast), time stamps of communications with the satellite, or any combinations thereof. In cases in which the satellite timing reference is used for UE uplink timing (e.g., in examples in which the gNB is a satellite and not a ground gateway), the UE may calculate the RTD and timing variation for RTD between UE and satellite. In such cases, the UE may not consider the RTD variation between satellite and gateway. In some cases, the RTD between satellite and gateway may be broadcast for initial access.

Figure 5:
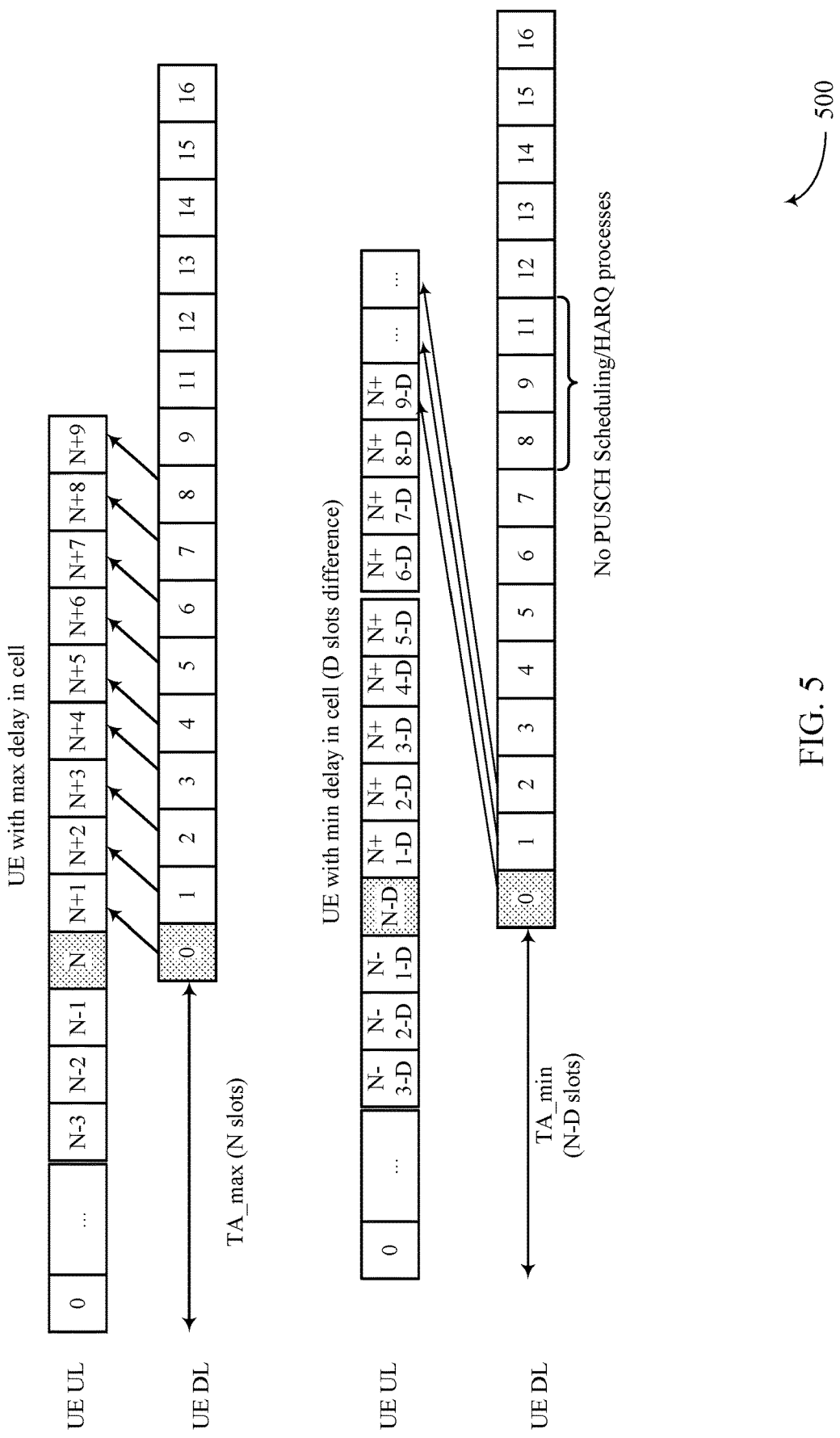
FIG. 5 illustrates an example of a frame timing diagram that supports improved data channel timelines in wireless communications systems in accordance with aspects of the present disclosure.

FIG. 5 illustrates an example of a frame timing diagram 500 that supports improved data channel timelines in wireless communications systems in accordance with aspects of the present disclosure. In some examples, the frame timing diagram 500 may implement or be implemented to realize aspects of the wireless communications system 100, the wireless communications system 200, the frame timing diagram 300, the frame timing diagram 301, the timing diagram 400, or the timing diagram 401. For example, the frame timing diagram 500 may be based on a configuration by a gateway (or a satellite 120) and implemented by a UE 115 for estimating and determining uplink timing (or implemented by a satellite 120 for estimating and determining downlink timing) in an NTN, as described with reference to FIGS. 1-4. Generally, FIG. 5 may illustrate one or more aspects that may provide for more efficient HARQ procedures between a base station (a gNB, which may refer to a gateway or a satellite) and a UE based on timing fully aligned at the network.

In an example of FIG. 5, a satellite may schedule a UE to transmit an uplink transmission in a satellite DL slot 0. Based on a scheduling offset ($K_{offset}$=N) and a TA, UEs may determine an uplink radio frame timing structure (e.g., UE UL timing) such that the UE UL may be transmitted according to a TA for satellite reception of the uplink message in the frame in which the satellite expects to receive the uplink message (e.g., such that the uplink transmission from the UE arrives at the satellite aligned with a frame boundary expected for downlink scheduling in satellite DL slot 0). For instance, in some cases, a network may implement a K2 offset for uplink (PUSCH) communications scheduled by a downlink (e.g., PDCCH) grant. Further, in some cases, K1 may refer to a time offset between PDSCH and HARQ-ACK (e.g., a PUCCH transmission). In some cases, K2=3 slots, and a satellite scheduling an uplink transmission via a DL slot 0 may except to receive a corresponding uplink message (e.g., a PUSCH, HARQ-ACK, etc.) in an UL slot 3. In such cases, UEs may determine an uplink radio frame timing structure (e.g., UE UL timing) based on a scheduling offset ($K_{offset}$=N), a slot offset (K2=3), and a TA, such that the UE UL (e.g., an uplink message) may be transmitted according to a TA for satellite reception of the uplink message in the slot in which the satellite expects to receive the uplink message (e.g., in a satellite UL slot 3).

For example, for the transmission timing of DCI scheduled PUSCH (e.g., including channel state information (CSI) on PUSCH), the slot allocated for PUSCH may be determined by $$n * \frac{2^{\mu PUSCH}}{2^{\mu PDCCH}} + K2 + K_{offset}.$$

For the transmission timing of HARQ-ACK on a physical uplink control channel (PUCCH), the UE may provide corresponding HARQ-ACK information in a PUCCH transmission within slot n+K1+$K_{offset}$. A UE may thus determine $K_{offset}$, K1, and K2 for radio frame timing structure identification and uplink transmission timing. $K_{offset}$, K1, or K2 may be preconfigured or specified by a network (e.g., such as an NTN), may be signaled by the network (e.g., via system information, RRC signaling, a MAC CE, etc.), or both. In some cases, UEs may receive an indication of a scheduling offset, $K_{offset}$=N from a gNB (e.g., a base station or satellite). UEs may determine an RTT for communications with the gNB and determine a TA based on $K_{offset}$=N and the determined RTT. As such, UEs with various delays (e.g., different RTTs) within the cell may transmit uplink messages to the gNB in accordance with timing alignment at the network. In the example of the frame timing diagram 500, $K_{offset}$=N and the TA used for a PUSCH and a physical random access channel (PRACH) may be based on the UE-specific RTT ($N_X$), which may be determined by the UE or signaled by the satellite in RTD information. $K_{offset}$ may refer to a scheduling offset (e.g., from 0-32 slots, or more slots for NTNs). $K_{offset}$ may be signaled to UEs in the cell via system information (e.g., via a system information block (SIB) or other signaling). As an example, without $K_{offset}$, for 15 kilohertz (kHz) subcarrier spacing (SCS) and a 30 ms (30 slot) scheduling delay, if TA=200 ms, an uplink message corresponding to a grant received in a slots (or SFN s) may be transmitted in a slot s−170+K, where K may be indicated in the DCI and may indicate an additional offset on top of (i.e., in addition to) the scheduling offset. As such, NTNs may implement $K_{offset}$ such that if a baseline TA (e.g., N) is present, the scheduling delay starts at the baseline TA (e.g., N) via implementation of the $K_{offset}$=N, where N corresponds to the worst case RTT, as described herein. Therefore, UEs with delays other than the worst case RTT (N) may adjust their radio frame timing structure or uplink timing such that their TA accounts for their $N_X$ (e.g., via TA=N−$N_X$, or TA=N−D for the UE with the minimum delay in the cell).

$K_{offset}$ and TA may thus offset each other to some extent depending on the best case scenario RTT of the cell and a UE's RTT in comparison to the best case RTT captured by $K_{offset}$ (e.g., a UE with max delay in cell applies max TA of N slots). $K_{offset}$=N may be included as a part of UE radio frame timing structure such that TA=N is applied (e.g., to align uplink frame N with downlink frame 0 for the UE with maximum delay within the cell).

In the example of FIG. 5, D=8 slots and 8 HARQ processes may be supported. As described herein, due to potentially large differences in TAs between UEs within a cell of an NTN, a satellite may run out of HARQ processes before receiving corresponding transmissions from a UE, which may result in latency as the satellite waits for corresponding transmissions before being able to reuse HARQ processes for subsequent transmissions. In other words, in some cases, a UE may not be scheduled with a second PUSCH corresponding to a HARQ process (e.g., a HARQ process ID) until the UE has transmitted the current PUSCH corresponding to the HARQ process (e.g., a satellite may not reuse a HARQ process ID for two scheduled communications that have not yet been performed by the UE). Likewise, a UE may not expect to be scheduled to transmit another PUSCH by DCI format 0_0 or 0_1 scrambled by cell radio network temporary identifier (C-RNTI) or a modulation and coding scheme (MCS) cell radio network temporary identifier (MCS-C-RNTI) for a given HARQ process until after the end of the expected transmission of the last PUSCH for that HARQ process.

Therefore, without the techniques described herein, a satellite or base station may run out of HARQ processes, which may result in latency as the satellite or base station waits for corresponding transmissions before being able to reuse HARQ processes for subsequent transmissions. For instance, as illustrated in FIG. 5, UEs within an NTN may be associated with relatively large differences in RTTs (e.g., such as D=8). As such, a satellite or base station may run out of HARQ processes when serving UEs with less delay in the cell relative to other UEs in the cell. For example, slots 8, 9, and 10 in UE DL timing for a UE with minimum delay (e.g., with D slots difference compared to the UE with the maximum RTT in the cell) may not schedule PUSCH, as a satellite or base station may run out of HARQ processes.

The techniques described herein may thus provide for improved HARQ management, which may reduce latency (e.g., in such scenarios in which scheduling may otherwise exceed HARQ process capacity). For example, in accordance with some aspects of the described techniques, $K_{offset}$ for various UEs may be updated or overridden by a network (e.g., via unicast RRC configuration). In such cases, the UE may use an initial scheduling offset indicated by system information for RACH ($K_{offsetSIB}$) and the UE may use another configured scheduling offset $K_{offset}$ once in connected mode. For instance, the UE may use $K_{offsetSIB}$ or $K_{offset}$ (e.g., for determining uplink frame timing) depending on the radio network temporary identifier (RNTI) or the type of RNTI. For example, for Msg3 transmission in contention-based random access, the UE may use $K_{offsetSIB}$ and in connected mode for C-RNTI the UE may use $K_{offset}$. Additionally or alternatively, wireless communications systems may support negative values for K1 or K2 (e.g., where K1 or K2 may be in unicast RRC configuration).

In some examples, wireless communications systems may allow for a UE to be scheduled with a second PUSCH corresponding to a HARQ process (e.g., a HARQ process ID) before it has transmitted the current PUSCH corresponding to the HARQ process (e.g., a satellite may reuse a HARQ process ID for two scheduled communications that have not yet been performed by the UE). For instance, in some cases, for PUSCH associated with HARQ processes that are marked as "no retransmission," (or processes for which HARQ is disabled) the rule of PUSCH before DCI may not apply. Additionally or alternatively, a separation distance (e.g., a separation threshold, a timing threshold, a minimum time interval, etc.) may be implemented to maintain transmission sequencing (e.g., such that the transmission pipeline may not be broken when reusing a HARQ process).

In some cases, the separation distance may be defined for retransmissions of the same transport block (TB). In some examples, the separation distance may be defined between two consecutive PUSCH (e.g., the separation distance may be defined from the end of a first PUSCH to the beginning of a second PUSCH, the separation distance may be defined from the beginning of a first PUSCH to the beginning of the second PUSCH, etc.). Alternatively, the separation distance may be defined between two DCI messages scheduling the same PUSCH (e.g., between two DCI messages reusing a HARQ process or using a same HARQ process ID). As used herein, a same PUSCH may refer to PUSCH for the same HARQ process ID. The separation distance may be configured as a quantity of slots, as a quantity of symbols, as a time duration (e.g., in milliseconds), etc. In some cases, the separation distance may depend on a numerology, an SCS, etc. In some examples, the rule of PUSCH before DCI may apply (e.g., a UE may not be scheduled with a second PUSCH corresponding to a HARQ process ID until it has transmitted the current PUSCH corresponding to the HARQ process ID) if the two PUSCH or the two DCI have a same new data indicator (NDI). In some examples, the rules above (e.g., minimum separation between PUSCH of same HARQ ID) may apply if the two PUSCH or the two DCI have the same NDI.

Generally, the separation distance may provide for enough processing time (e.g., for decoding PUSCH, encoding PUSCH, determining HARQ feedback, generating HARQ feedback, etc.) if two PUSCHs are received back-to-back (e.g., as before the second PUSCH is processed the first PUSCH may be processed). The separation distance may provide for a minimum time duration between when a same HARQ process ID is used for a first transmission and for a second transmission.

In some examples, HARQ process management may consider differences in RTTs and TAs used by UEs within the NTN. For example, HARQ process capacity may be approached by UEs with less delay. Wireless communications systems may support HARQ process management techniques that take into account the difference in D across UEs. For example, a UE may not expect to be scheduled to transmit another PUSCH by DCI format 0_0 or 0_1 scrambled by C-RNTI or MCS-C-RNTI for a given HARQ process until time instant T=PUSCH_end−D, where PUSCH_end is the time instant of the end of the expected transmission of the last PUSCH for that HARQ process, and D=$K_{offset}$*slot duration−TA. In other words, the UE may receive DCI associated with reused HARQ process ID if the DCI is received no earlier than D time units before the end of the PUSCH.

In some cases, one or more aspects of the techniques described herein may be modified for uplink. For a scheduled cell and at any time, a UE may expect to have received some quantity (e.g., at most 16) of PDCCHs for DCI formats 1_0 or 1_1 with CRC scrambled by C-RNTI, configured scheduling RNTI (CS-RNTI), or MCS-C-RNTI scheduling (e.g., 16) physical downlink shared channel (PDSCH) receptions for which the UE has not received any corresponding PDSCH symbol and at most (e.g., 16) PDCCHs for DCI formats 0_0 or 0_1 with CRC scrambled by C-RNTI, CS-RNTI, or MCS-C-RNTI scheduling (e.g., 16) PUSCH transmissions for which the UE has not transmitted any corresponding PUSCH symbol.

In some examples, the limit of PUSCH (e.g., 16) may be increased for NTN, may depend on the value of the TA, etc. The limit may also be different for different satellite deployments (e.g., based on ephemeris information, may be larger for GEO than for LEO), may depend on the signaled value of D, the numerology, etc. In some cases, a UE may transmit an indication of the UE HARQ/PDCCH capability to the network, and the network may then indicate an increased PUSCH limit or an increased quantity of available HARQ processes.

One or more aspects of the described techniques may also be applied for downlink throughput (e.g., for PDSCH, but for HARQ-ACK transmission instead of being for PUSCH transmission). In some cases, the UE may not expect to receive another PDSCH for a given HARQ process until after the end of the expected transmission of HARQ-ACK for that HARQ process. A separation distance (e.g., a minimum separation) between two PDSCH (e.g., between the end of a first PDSCH and beginning of a second PDSCH) may be defined for UE processing. In some cases, a rule that the UE may not expect to receive another PDSCH for a given HARQ process until after the end of the expected transmission of HARQ-ACK for that HARQ process may apply for HARQ processes with HARQ-ACK feedback. For HARQ processes without HARQ-ACK feedback, the separation distance may apply (e.g., and a UE may expect to receive another PDSCH for a given HARQ process before the end of the expected transmission of HARQ-ACK for that HARQ process).

Additionally or alternatively, the separation distance may be defined between two DCI messages scheduling the same PDSCH (e.g., between two DCI messages reusing a HARQ process or using a same HARQ process ID). As used herein, a same PDSCH may refer to PDSCH for the same HARQ process ID. The separation distance may be configured as a quantity of slots, as a quantity of symbols, as a time duration (e.g., in milliseconds), etc. In some cases, the separation distance may depend on numerology, SCS, etc. In some examples, the rule of HARQ-ACK before DCI may apply (e.g., a UE may not be scheduled with a second PDSCH corresponding to a HARQ process ID until it has transmitted the current HARQ-ACK corresponding to the HARQ process ID) if the two PDSCH or the two DCI have the same NDI. In some examples, the rules above (e.g., minimum separation between PDSCH of same HARQ ID) may apply if the two PDSCH or the two DCI have the same NDI.

Figure 6:
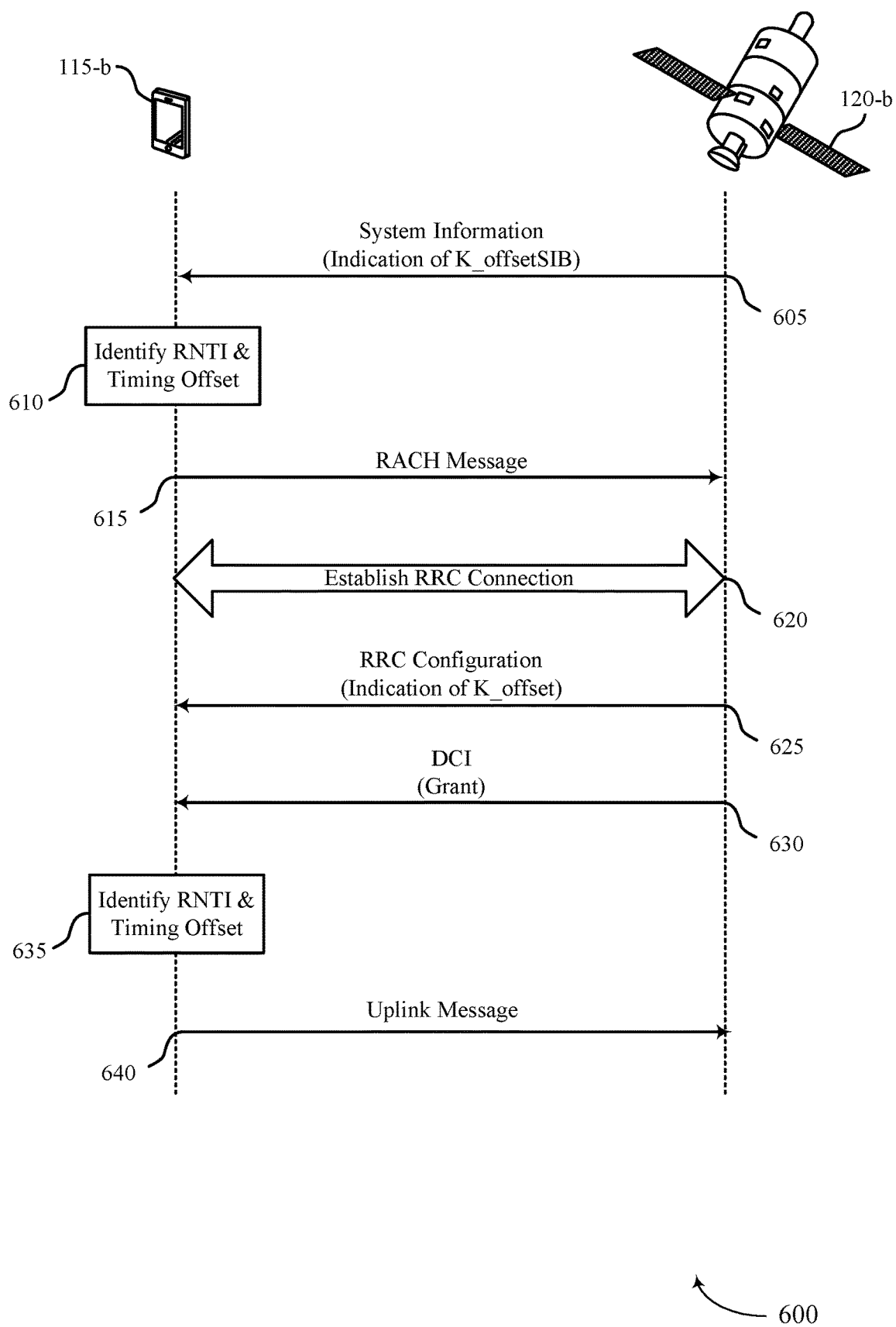
FIG. 6 illustrates an example of a process flow that supports improved data channel timelines in wireless communications systems in accordance with aspects of the present disclosure.

FIG. 6 illustrates an example of a process flow 600 that supports timing improvements for NTNs in accordance with one or more aspects of the present disclosure. In some examples, the process flow 600 may implement or be implemented to realize aspects of the wireless communications system 100, the wireless communications system 200, the frame timing diagram 300, the frame timing diagram 301, the timing diagram 400, the timing diagram 401, or the frame timing diagram 500 (e.g., as described with reference to FIGS. 1-5). For example, the process flow 600 may illustrate updating or overriding configuration of a scheduling offset (e.g., updating $K_{offset}$=N for RACH to $K_{offset}$=N−D for connected mode), as described with reference to FIGS. 1-5.

The process flow 600 may include a satellite 120-b and a UE 115-b, which may be examples of a gNB (or a base station 105) and a UE 115 as described with reference to FIGS. 1-5. For example, the satellite 120-b may be an example of a satellite 120, a ground base station 105 or gateway, etc., as described herein. In the following description of the process flow 600, the operations between the satellite 120-b and the UE 115-b may be performed in a different order than the example order shown, or the operations performed by the satellite 120-b and the UE 115-b may be performed in different orders or at different times. Some operations may also be omitted from the process flow 600, and other operations may be added to the process flow 600. In the example of FIG. 6, the satellite 120-b and the UE 115-b may be in communication with each other via an NTN. The process flow 600 may support improved timing and higher data rates, among other benefits.

At 605, the satellite 120-b may transmit a system information message (e.g., a SIB) to the UE 115-b, and the system information message may include a first indication of a first transmission timing offset (e.g., $K_{offset}$=N, $K_{offsetSIB}$=N, etc.) for a cell in an NTN.

At 610, in some cases, the UE 115-b may identify an RNTI (e.g., a system information RNTI (SI-RNTI)) associated with the system information message received at 605. For example, the UE 115-b may identify (e.g., based on decoding, descrambling, etc.) that the RNTI is a type of RNTI (e.g., an SI-RNTI) associated with a system information message.

At 615, the UE 115-b may transmit a RACH message based on the first transmission timing offset (e.g., $K_{offset}$=N). For example, in some cases, the UE 115-b may apply the first transmission timing offset when transmitting the RACH message based on the RNTI identified at 610.

At 620, the satellite 120-b and the UE 115-b may establish an RRC connection (e.g., based on the RACH message transmitted by the UE 115-b at 615). For example, in some cases, the RACH message transmitted by the UE 115-b at 615 may include a RACH preamble, a RACH Msg1, a RACH MsgA, etc. The satellite 120-b may receive the RACH message and determine that the UE 115-b is attempting to perform an initial access procedure to connect to the cell. Establishment of the RRC connection at 620 may include signaling between the satellite 120-b and the UE 115-b for synchronization. In some cases, establishment of the RRC connection at 620 may include one or more aspects of a 2-step RACH procedure, a 4-step RACH procedure, etc.

At 625, the satellite 120-b may transmit an RRC message including a second indication of a second transmission timing offset (e.g., $K_{offset}$=N−D) that is based on an RTT for communications between the UE 115-b and the cell in the NTN. For example, the second transmission timing offset may be based on a difference between an RTT associated with the UE 115-b and a worst or largest RTT associated with the cell. For instance, the second transmission timing offset may be less than the first transmission timing offset to reduce scheduling delay (e.g., delay between when the satellite 120-b transmits a grant to schedule an uplink or downlink communication and when the UE 115-b is able to transmit or receive the scheduled uplink or downlink communication). A reduced transmission timing offset may thus reduce potential latency arising from limitations on a quantity of HARQ processes. In some cases, the second indication of the second transmission timing offset may be referred to herein as updating or overriding the first indication of the first transmission timing offset.

For example, in some cases, the satellite 120-*b* may determine the second transmission timing offset based on a TA and a differential offset (e.g., $N_X$–D) associated with the UE 115-*b* (e.g., where the TA and the differential offset may be determined based on a third indication of the TA and the differential offset included in the RACH message at 615). In some cases, the satellite 120-*b* may determine the RTT for communications between the UE 115-*b* and the cell of the NTN (e.g., the satellite 120-*b* may determine $N_X$ associated with the UE 115-*b*), where the TA and the differential offset may be determined based on the RTT. Additionally or alternatively, the UE 115-*b* may determine a TA and a differential offset based on the first transmission timing offset and an RTT (e.g., where the RACH message may include a third indication of the TA and the differential offset). Similarly, in some cases, the UE 115-*b* may determine the RTT for communications between the UE 115-*b* and the cell of the NTN (e.g., the satellite 120-*b*), where determining the TA and the differential offset may be based on the UE 115-*b* determining the RTT or based on RTD information received from the satellite 120-*b* (e.g., which may be included in the system information at 605, indicated during RRC connection establishment at 620, etc.).

At 630, the satellite 120-*b* may transmit a DCI message including a grant for an uplink message. For example, in cases in which the DCI schedules PUSCH, the DCI may include a grant indicating time and frequency resources for PUSCH and the UE 115-*b* may transmit an uplink message (e.g., a PUSCH message) at 640 accordingly. In some other cases in which the DCI schedules PDSCH, the DCI may include a grant indicating time and frequency resources for the PDSCH. In such cases, the satellite 120-*b* may transmit a downlink PDSCH transmission in accordance with the scheduling and the UE 115-*b* may transmit an uplink message (e.g., a HARQ-ACK message) at 640 accordingly (e.g., based on whether or not the downlink PDSCH transmission was successfully decoded at the UE 115-*b*).

At 635, in some cases, the UE 115-*b* may identify an RNTI (e.g., a C-RNTI) associated with the DCI message received at 630. For example, the UE 115-*b* may identify (e.g., based on decoding, descrambling, etc.) the RNTI is a type of RNTI (e.g., a C-RNTI) associated with connected mode operation (e.g., associated with DCI).

At 640, the UE 115-*b* may transmit the uplink message (e.g., a PUSCH message or a HARQ message, depending on the grant at 630) based on the second transmission timing offset (e.g., $K_{offset}$=N–D). For example, in some cases, the UE 115-*b* may apply the second transmission timing offset when transmitting the uplink message based on the RNTI identified at 635. In some cases, the UE 115-*b* may determine an uplink slot for transmission of the uplink message based on the second transmission timing offset and a downlink slot associated with a DCI message corresponding to the uplink message (e.g., based on K1 or K2), where the uplink message is transmitted in the determined uplink slot at 640.

The process flow 600 may illustrate scheduling offset configuration (e.g., updating or overriding of $K_{offset}$) for improved HARQ processes as described herein. For example, according to these techniques, a wireless communications system (e.g., an NTN) may reduce scheduling offsets for UE communications associated with less RTT (e.g., for UEs with $N_X$<N). As such, UEs less delay than the max delay (e.g., UEs with $N_X$<N) may have scheduling offset updated by the network such that the scheduling delay (e.g., the delay between a grant and a corresponding uplink transmission) for the particular UE may be reduced. As such, systems with a limited set of HARQ processes may reuse HARQ process IDs more readily (e.g., faster) as a HARQ process may be freed or made available for reuse quicker due to the reduced scheduling delay (e.g., due to PUSCH associated with a HARQ process being transmitted with less scheduling delay relative to the corresponding DCI).

Figure 7:
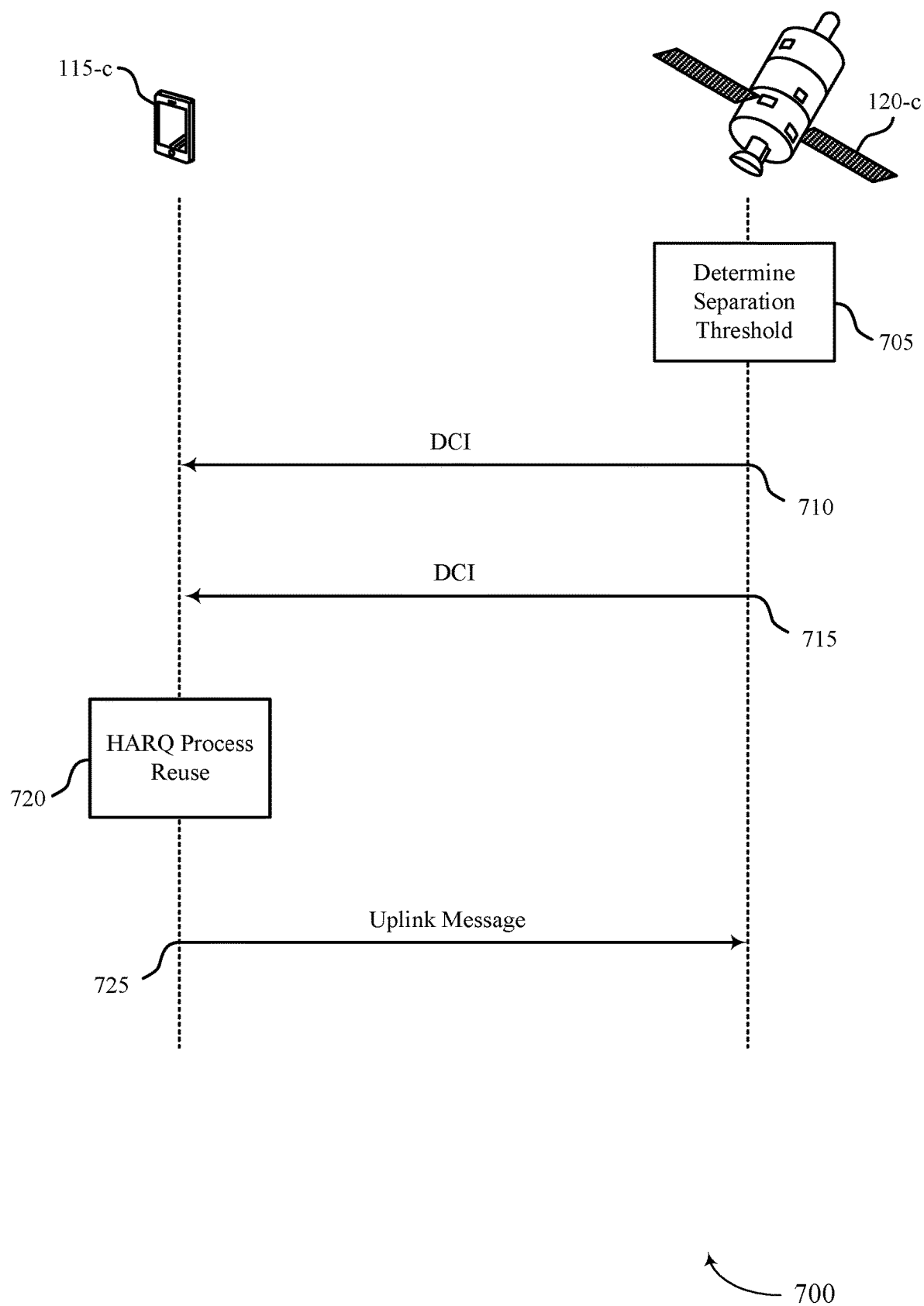
FIG. 7 illustrates an example of a process flow that supports improved data channel timelines in wireless communications systems in accordance with aspects of the present disclosure.

FIG. 7 illustrates an example of a process flow 700 that supports timing improvements for NTNs in accordance with one or more aspects of the present disclosure. In some examples, the process flow 700 may implement aspects of the wireless communications system 100, the wireless communications system 200, the frame timing diagram 300, the frame timing diagram 301, the timing diagram 400, the timing diagram 401, the frame timing diagram 500, or the process flow 600 (e.g., as described with reference to FIGS. 1-6). For example, the process flow 700 may illustrate UE 115-*c* being scheduled with a second PUSCH corresponding to a HARQ process (e.g., a HARQ process ID) before it has transmitted the current or first PUSCH corresponding to the HARQ process (e.g., the process flow 700 may illustrate a satellite 120-*c* reusing a HARQ process ID for two scheduled communications that have not yet been performed by the UE 115-*c*), as described with reference to FIGS. 1-5.

The process flow 700 may include a satellite 120-*c* and a UE 115-*c*, which may be examples of a gNB (or a base station 105) and a UE 115 as described with reference to FIGS. 1-6. For example, the satellite 120-*c* may be an example of a satellite 120, a ground base station 105 or gateway, etc., as described herein. In the following description of the process flow 700, the operations between the satellite 120-*c* and the UE 115-*c* may be performed in a different order than the example order shown, or the operations performed by the satellite 120-*c* and the UE 115-*c* may be performed in different orders or at different times. Some operations may also be omitted from the process flow 700, and other operations may be added to the process flow 700. In the example of FIG. 7, the satellite 120-*c* and the UE 115-*c* may be in communication with each other via an NTN. The process flow 700 may support improved timing, higher data rates, improved mobility support for the UE 115-*c* in the NTN, among other benefits.

At 705, the satellite 120-*c* may determine a separation threshold associated with communications between the UE 115-*c* and a cell in an NTN (e.g., to determine timing associated with DCI transmitted at 710 and 715). In some cases, the separation threshold may be specified or preconfigured by the network. In some examples, the separation threshold includes a time duration (e.g., a minimum time threshold) between a first uplink message scheduled by DCI at 710 and a second uplink message scheduled by DCI at 715. In some cases, the separation threshold includes a time duration (e.g., a minimum time threshold) between the first DCI message at 710 and the second DCI message at 715. In some cases, the separation threshold includes (e.g., indicates) a quantity of slots or a quantity of symbols (e.g., as the minimum time threshold between uplink messages, DCI, etc. as discussed herein). In some cases, the separation threshold is based on a numerology (e.g., a SCS, an SFN structure, a slot structure, a radio frame timing structure, etc.).

At 710, the satellite 120-*c* may transmit, to the UE 115-*c*, a first DCI message scheduling a first uplink message associated with a HARQ process (e.g., associated with a HARQ process ID).

At 715, the satellite 120-*c* may transmit, to the UE 115-*c* and based on the separation threshold determined or adhered to at 705, a second DCI message scheduling a second uplink message associated with the HARQ process (e.g., associated with the same HARQ process ID). In some cases, the second DCI message may be received by the UE 115-c within a time interval prior to transmitting the first uplink message at 725 (e.g., where the time interval is based on a transmission timing offset and a TA associated with transmit the first uplink message, such as T=PUSCH_end−D, where D=$K_{offset}$*slot duration−TA).

At 720, the UE 115-c may determine or identify that the HARQ process is being reused in accordance with one or more aspects of the techniques described herein. For example, in some cases, the UE 115-c may identify that the HARQ process is associated with a single transmission attempt (e.g., that the HARQ process associated with the DCI and the first uplink transmission is marked as a "no retransmission," and thus that the HARQ process may be reused prior to the UE 115-c transmitting the first uplink transmission at 725), and the first uplink message may be transmitted based on the identification. Additionally or alternatively, the UE 115-c may identify that the first uplink message (e.g., scheduled by the DCI at 710) and the second uplink message (e.g., scheduled by the DCI at 715) are associated with a same TB (e.g., and thus that the HARQ process may be reused prior to the UE 115-c transmitting the first uplink transmission at 725), where the first uplink message may be transmitted based on the identification.

At 725, the UE 115-c may transmit a first uplink message (e.g., a first uplink message corresponding to the DCI received at 710) after receiving the second DCI message. For example, the first uplink message may include a PUSCH transmission in cases in which the DCI at 710 includes a grant for a PUSCH transmission. In cases in which the DCI at 710 includes a grant for PDSCH, the UE 115-c may monitor for the corresponding PDSCH transmission and the first uplink message at 725 may include HARQ feedback (e.g., an ACK or a negative ACK (HACK) based on whether or not the PDSCH transmission was successfully decoded by the UE 115-c).

In some cases (e.g., in some cases, prior to 710), the UE 115-c may transmit a first indication of a first quantity of supported HARQ processes based on a capability of the UE 115-c, and the UE 115-c may receive a second indication of a second quantity of HARQ processes based on the first indication of the first quantity of supported HARQ processes is based on the second quantity of HARQ processes (e.g., where the total set of HARQ processes between satellite 120-c and the UE 115-c, as well as the HARQ process ID associated with DCI at 710, 715, and 725, is based on the second quantity of HARQ processes). In some cases, the second quantity of HARQ processes may be based on a TA associated with transmit of the first uplink message, a numerology, a differential offset associated with the UE, an NTN cell HARQ process capacity, or some combination thereof.

Figure 8:
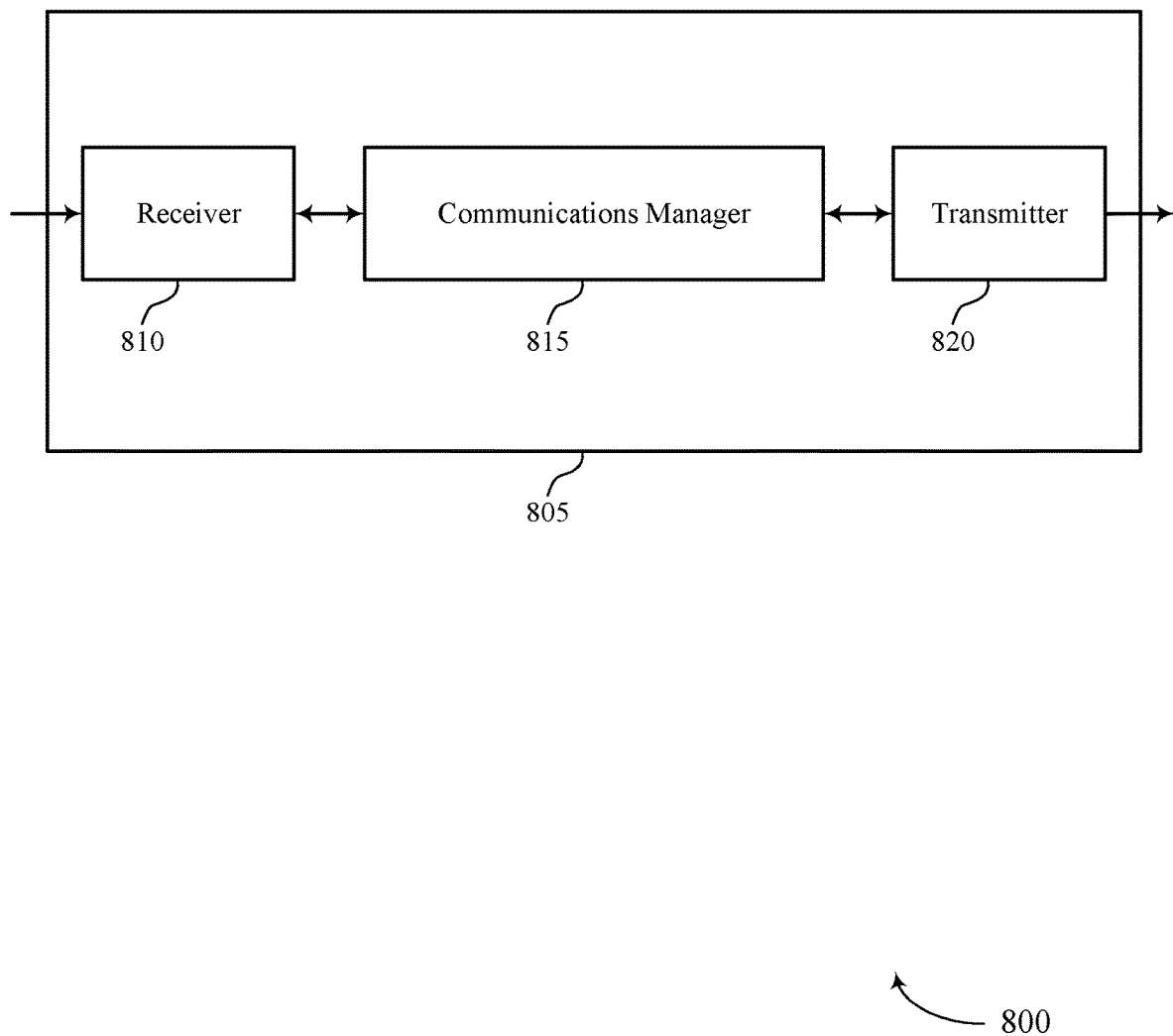

FIG. 8 shows a block diagram 800 of a device 805 that supports improved data channel timelines in wireless communications systems in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to improved data channel timelines in wireless communications systems, etc.). Information may be passed on to other components of the device 805. The receiver 810 may be an example of aspects of the transceiver 1120 described with reference to FIG. 11. The receiver 810 may utilize a single antenna or a set of antennas.

In some implementations, the communications manager 815 may receive a system information message including a first indication of a first transmission timing offset for a cell in an NTN, receive an RRC message including a second indication of a second transmission timing offset, and transmit an uplink message based on the second transmission timing offset.

Additionally or alternatively, the communications manager 815 may receive a first DCI message scheduling a first uplink message associated with a HARQ process, receive a second DCI message scheduling a second uplink message associated with the HARQ process, and transmit the first uplink message after receiving the second DCI message.

The communications manager 815 may be an example of aspects of the communications manager 1110 described herein. The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
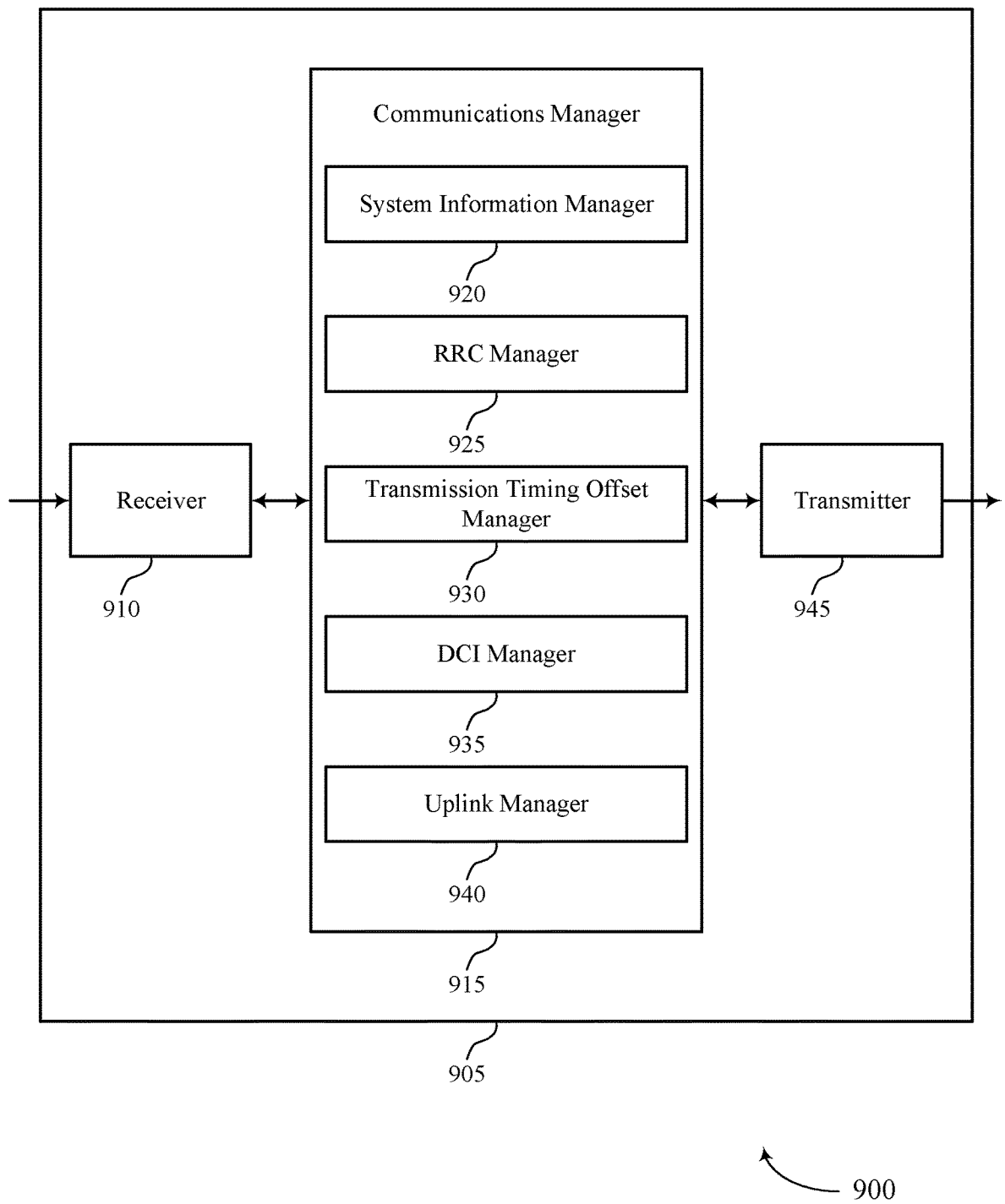

FIG. 9 shows a block diagram 900 of a device 905 that supports improved data channel timelines in wireless communications systems in accordance with aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to improved data channel timelines in wireless communications systems, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a system information manager 920, an RRC manager 925, a transmission timing offset manager 930, a DCI manager 935, and an uplink manager 940. The communications manager 915 may be an example of aspects of the communications manager 1110 described herein.

The system information manager 920 may receive a system information message including a first indication of a first transmission timing offset for a cell in an NTN. The RRC manager 925 may receive an RRC message including a second indication of a second transmission timing offset. The transmission timing offset manager 930 (e.g., or the uplink manager 940) may transmit an uplink message based on the second transmission timing offset.

The DCI manager 935 may receive a first DCI message scheduling a first uplink message associated with a HARQ process. The DCI manager 935 may receive a second DCI message scheduling a second uplink message associated with the HARQ process. The uplink manager 940 may transmit the first uplink message after receiving the second DCI message.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
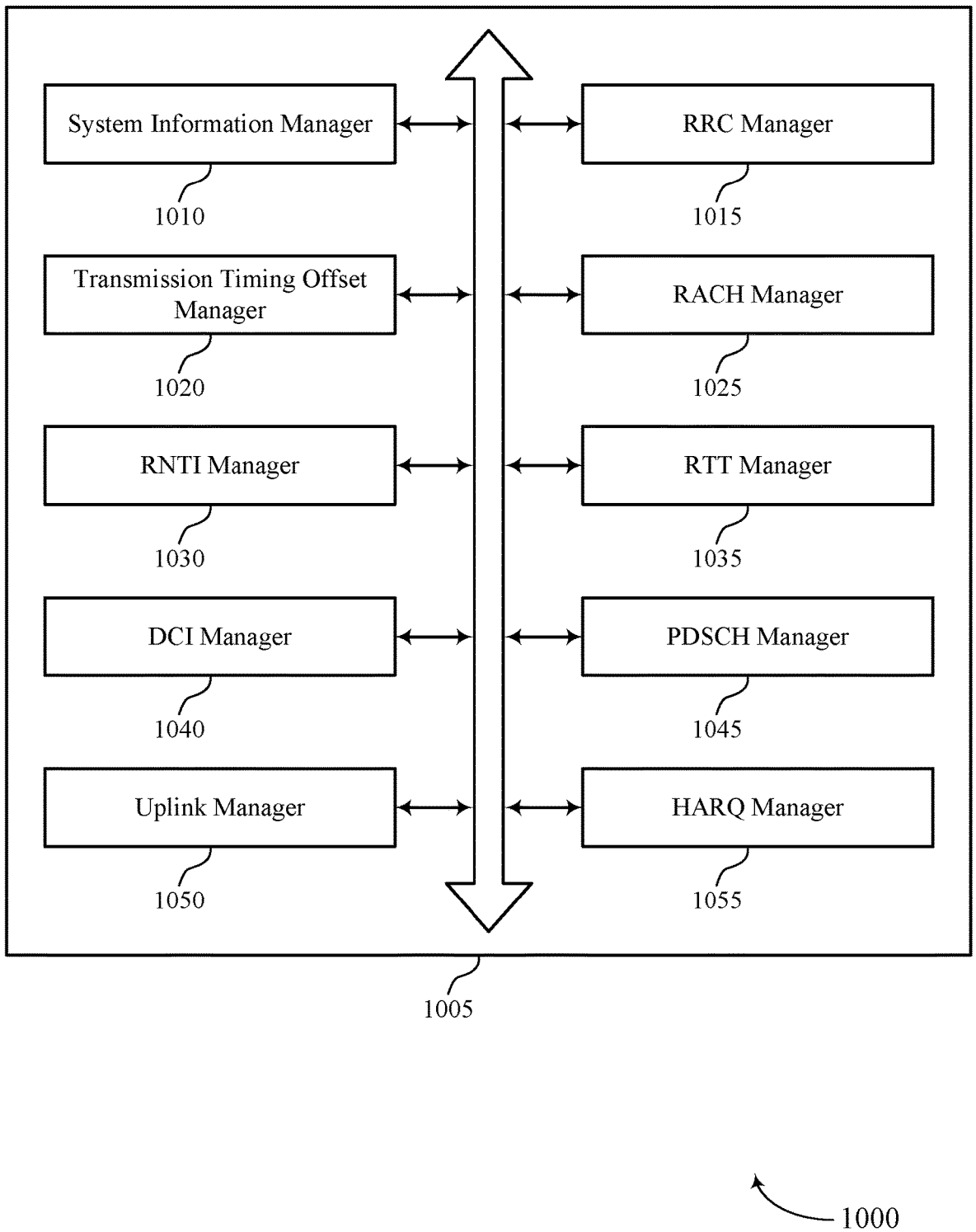

FIG. 10 shows a block diagram 1000 of a communications manager 1005 that supports improved data channel timelines in wireless communications systems in accordance with aspects of the present disclosure. The communications manager 1005 may be an example of aspects of a communications manager 815, a communications manager 915, or a communications manager 1110 described herein. The communications manager 1005 may include a system information manager 1010, an RRC manager 1015, a transmission timing offset manager 1020, a RACH manager 1025, an RNTI manager 1030, a RTT manager 1035, a DCI manager 1040, a PDSCH manager 1045, an uplink manager 1050, and a HARQ manager 1055. Each of these modules may communicate, directly or indirectly, with one another (e.g., via one or more buses).

The system information manager 1010 may receive a system information message including a first indication of a first transmission timing offset for a cell in an NTN.

The RRC manager 1015 may receive an RRC message including a second indication of a second transmission timing offset, where the second transmission timing offset is less than the first transmission timing offset. In some examples, the RRC manager 1015 may establish an RRC connection with a base station based on the RACH message, where the RRC message is received based on the RRC connection.

The transmission timing offset manager 1020 may transmit an uplink message based on the second transmission timing offset. In some examples, the transmission timing offset manager 1020 may apply the first transmission timing offset when transmitting the RACH message based on the RNTI, where the RACH message is transmitted based on the first transmission timing offset. In some examples, determining a TA and a differential offset based on the first transmission timing offset and an RTT, where the RACH message includes a third indication of the TA and the differential offset.

In some examples, the transmission timing offset manager 1020 may apply the second transmission timing offset when transmitting the uplink message based on the RNTI, where the uplink message is transmitted based on the grant and the second transmission timing offset. In some examples, determining the second transmission timing offset based on adding the first transmission timing offset and a negative offset, where the second indication includes the negative offset. In some examples, the transmission timing offset manager 1020 may determine an uplink slot for transmission of the uplink message based on the second transmission timing offset and a downlink slot associated with a DCI message corresponding to the uplink message, where the uplink message is transmitted in the uplink slot. In some cases, the second transmission timing offset is based on the third indication of the TA and the differential offset. In some cases, the second transmission timing offset is based on an RTT for communications between the UE and the cell in the NTN.

The RACH manager 1025 may transmit a RACH message based on the first transmission timing offset.

The RNTI manager 1030 may identify an RNTI associated with the RACH message. In some examples, the RNTI manager 1030 may identify an RNTI associated with the DCI message.

The RTT manager 1035 may determine the RTT for communications between the UE and the cell of the NTN, where the determining of the TA and the differential offset is based on the determining of the RTT.

The DCI manager 1040 may receive a first DCI message scheduling a first uplink message associated with a HARQ process. In some examples, the DCI manager 1040 may receive, based on a separation threshold associated with communications between the UE and a cell in an NTN, a second DCI message scheduling a second uplink message associated with the HARQ process. In some examples, the DCI manager 1040 may receive a DCI message including a grant for the uplink message. In some examples, the DCI manager 1040 may receive a DCI message including a grant for a downlink shared channel message. In some cases, a time duration between the first uplink message and the second uplink message includes a separation threshold.

In some cases, a time duration between the first DCI message and the second DCI message includes a separation threshold. In some cases, the separation threshold includes a quantity of slots or a quantity of symbols. In some cases, the separation threshold is based on a numerology. In some cases, the second DCI message is received within a time interval prior to transmitting the first uplink message. In some cases, the time interval is based on a transmission timing offset and a TA associated with transmitting the first uplink message. In some cases, a time duration between the first downlink shared channel message and a second downlink shared channel message includes a separation threshold.

The PDSCH manager 1045 may monitor for the downlink shared channel message based on the grant. In some examples, determining ACK feedback for the downlink shared channel message based on the monitoring, where the uplink message includes the ACK feedback for the downlink shared channel message. In some examples, monitoring for a first downlink shared channel message based on a grant, where the first DCI message includes the grant.

The uplink manager 1050 may transmit the first uplink message after receiving the second DCI message. In some examples, the uplink manager 1050 may identify that the first uplink message and the second uplink message are associated with a same TB, where the transmitting of the first uplink message is based on the identifying.

The HARQ manager 1055 may identify that the HARQ process is associated with a single transmission attempt, where the transmitting of the first uplink message is based on the identifying. In some examples, the HARQ manager 1055 may transmit a first indication of a first quantity of supported HARQ processes based on a capability of the UE. In some examples, the HARQ manager 1055 may receive a second indication of a second quantity of HARQ processes based on the first indication of the first quantity of supported HARQ processes, where an ID of the HARQ process is based on the second quantity of HARQ processes.

In some examples, determining ACK feedback for the first downlink shared channel message based on the monitoring, where the first uplink message includes the ACK feedback for the first downlink shared channel message. In some cases, the second quantity of HARQ processes is based on one or more of a TA associated with transmitting of the first uplink message, a numerology, and a differential offset associated with the UE. In some cases, the second quantity of HARQ processes is based on an NTN cell.

Figure 11:
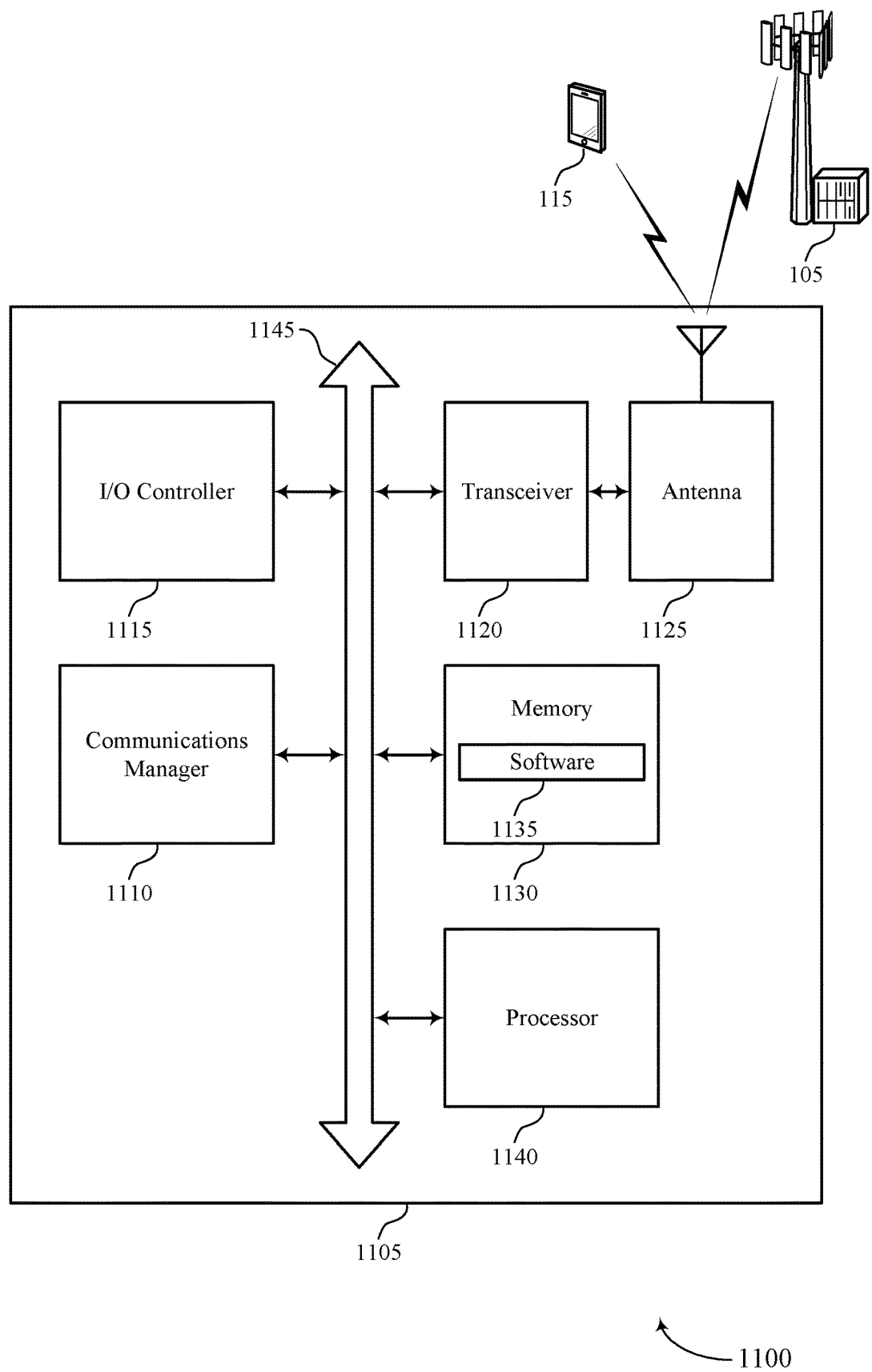

FIG. 11 shows a diagram of a system 1100 including a device 1105 that supports improved data channel timelines in wireless communications systems in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via or coupled with one or more buses (e.g., bus 1145).

In some implementations, the communications manager 1110 may receive a system information message including a first indication of a first transmission timing offset for a cell in an NTN, receive an RRC message including a second indication of a second transmission timing offset, and transmit an uplink message based on the second transmission timing offset.

Additionally or alternatively, the communications manager 1110 may receive a first DCI message scheduling a first uplink message associated with a HARQ process, receive a second DCI message scheduling a second uplink message associated with the HARQ process, and transmit the first uplink message after receiving the second DCI message.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include random-access memory (RAM) and read-only memory (ROM). The memory 1130 may store computer-readable, computer-executable code or software 1135 including instructions that, when executed, cause the processor to perform various functions described herein. In some cases, the memory 1130 may contain, among other things, a basic I/O system (BIOS) which may control basic hardware or software operation such as the interaction with peripheral components or devices.

The processor 1140 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting improved data channel timelines in wireless communications systems).

The software 1135 may include instructions to implement aspects of the present disclosure, including instructions to support wireless communications. The software 1135 may be stored in a non-transitory computer-readable medium such as system memory or other type of memory. In some cases, the software 1135 may not be directly executable by the processor 1140 but may cause a computer (e.g., when compiled and executed) to perform functions described herein.

Figure 12:
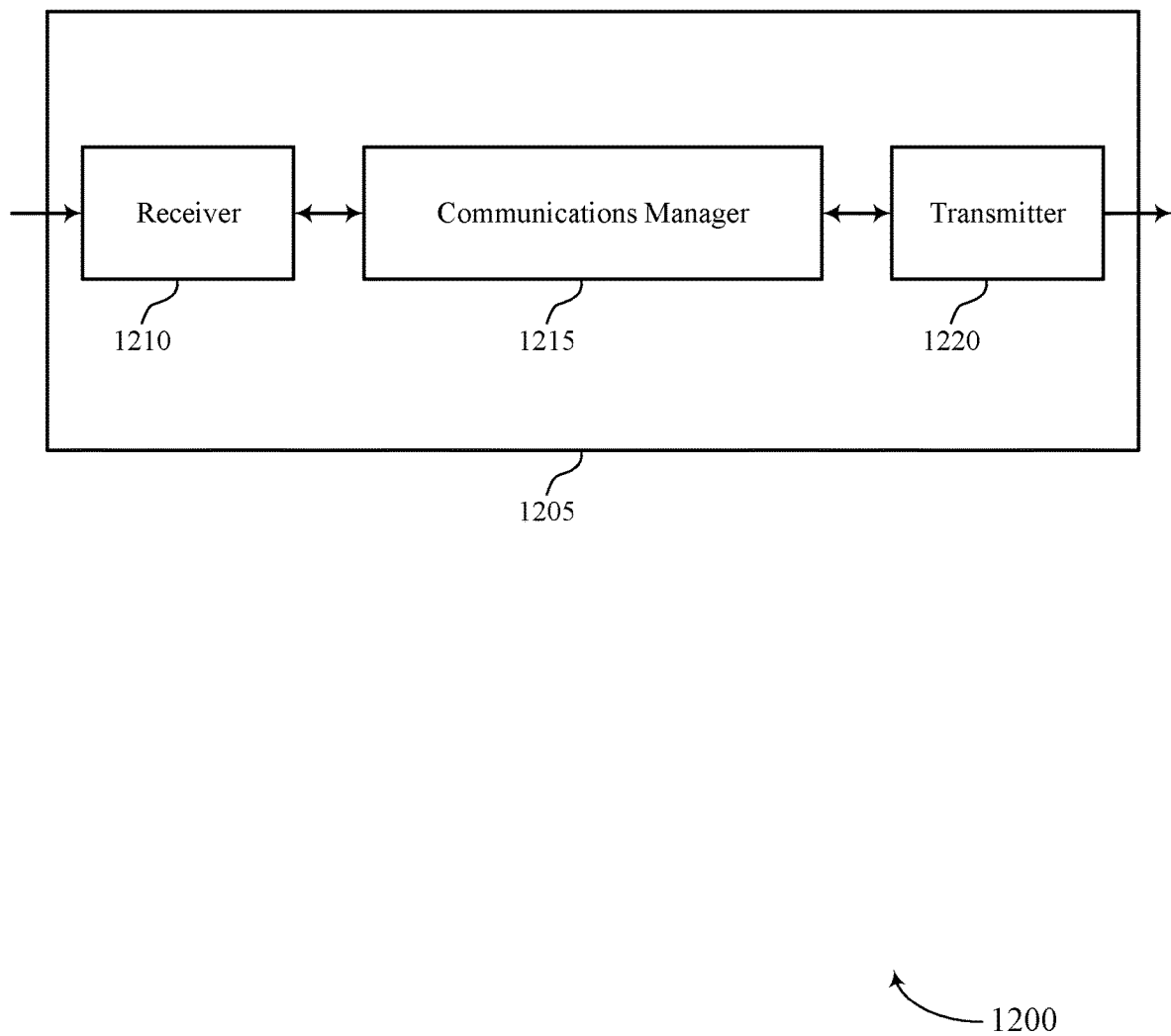

FIG. 12 shows a block diagram 1200 of a device 1205 that supports improved data channel timelines in wireless communications systems in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to improved data channel timelines in wireless communications systems, etc.). Information may be passed on to other components of the device 1205. The receiver 1210 may be an example of aspects of the transceiver 1520 described with reference to FIG. 15. The receiver 1210 may utilize a single antenna or a set of antennas.

In some implementations, the communications manager 1215 may transmit, to a UE, a system information message including a first indication of a first transmission timing offset for a cell in an NTN, transmit, to the UE, an RRC message including a second indication of a second transmission timing offset that is based on an RTT for communications between the UE and the cell in the NTN, and receive, from the UE, an uplink message based on the second transmission timing offset.

Additionally or alternatively, the communications manager 1215 may transmit, to a UE, a first DCI message scheduling a first uplink message associated with a HARQ process, transmit, to the UE, a second DCI message scheduling a second uplink message associated with the HARQ process, and receive, from the UE, the first uplink message after transmitting the second DCI message.

The communications manager 1215 may be an example of aspects of the communications manager 1510 described herein. The communications manager 1215, or its subcomponents, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
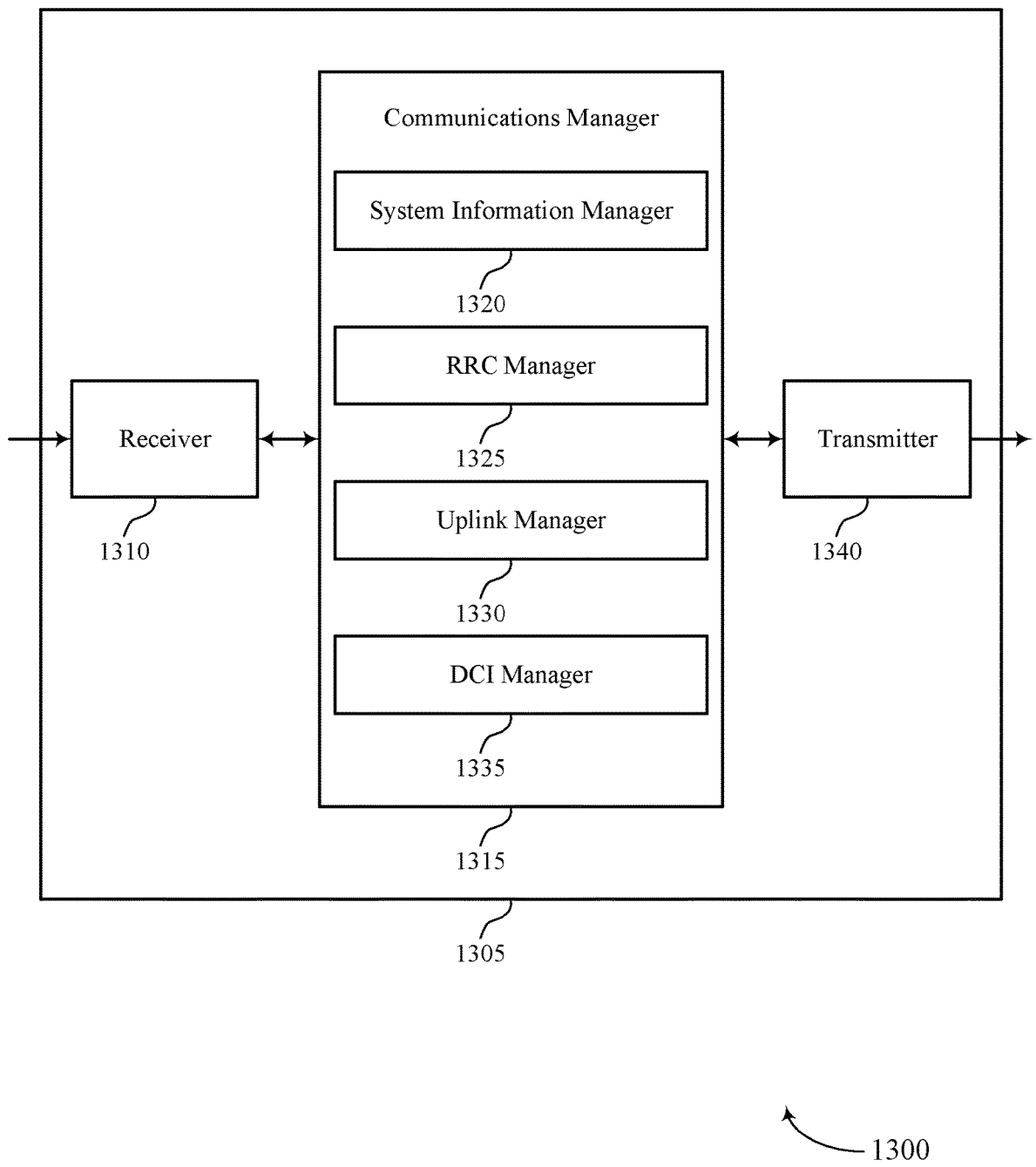

FIG. 13 shows a block diagram 1300 of a device 1305 that supports improved data channel timelines in wireless communications systems in accordance with aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to improved data channel timelines in wireless communications systems, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a system information manager 1320, an RRC manager 1325, an uplink manager 1330, and a DCI manager 1335. The communications manager 1315 may be an example of aspects of the communications manager 1510 described herein.

The system information manager 1320 may transmit, to a UE, a system information message including a first indication of a first transmission timing offset for a cell in an NTN. The RRC manager 1325 may transmit, to the UE, an RRC message including a second indication of a second transmission timing offset that is based on an RTT for communications between the UE and the cell in the NTN. The uplink manager 1330 may receive, from the UE, an uplink message based on the second transmission timing offset.

The DCI manager 1335 may transmit, to a UE, a first DCI message scheduling a first uplink message associated with a HARQ process. The DCI manager 1335 may transmit, to the UE, a second DCI message scheduling a second uplink message associated with the HARQ process. The uplink manager 1330 may receive, from the UE, the first uplink message after transmitting the second DCI message.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
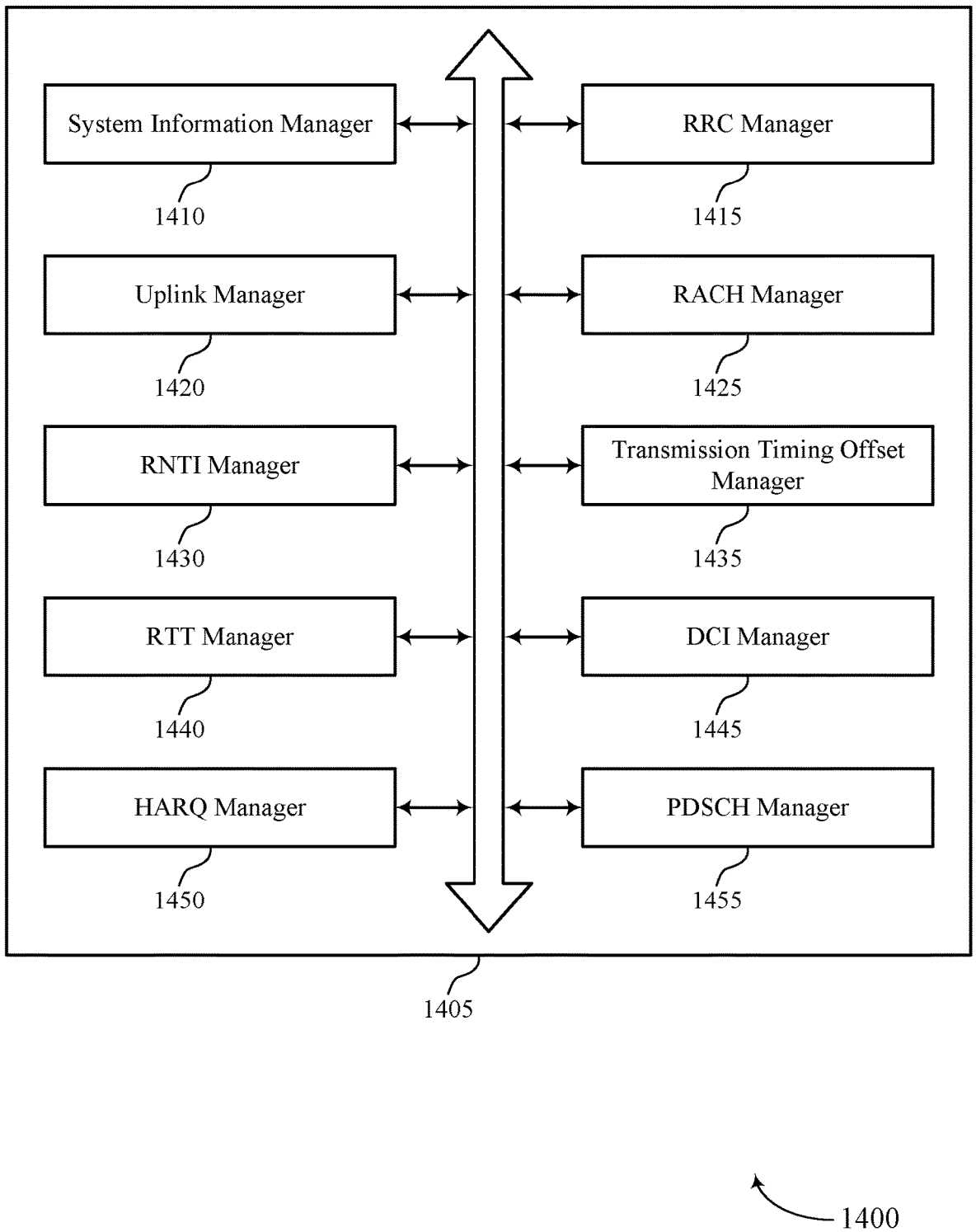

FIG. 14 shows a block diagram 1400 of a communications manager 1405 that supports improved data channel timelines in wireless communications systems in accordance with aspects of the present disclosure. The communications manager 1405 may be an example of aspects of a communications manager 1215, a communications manager 1315, or a communications manager 1510 described herein. The communications manager 1405 may include a system information manager 1410, an RRC manager 1415, an uplink manager 1420, a RACH manager 1425, an RNTI manager 1430, a transmission timing offset manager 1435, a RTT manager 1440, a DCI manager 1445, a HARQ manager 1450, and a PDSCH manager 1455. Each of these modules may communicate, directly or indirectly, with one another (e.g., via one or more buses).

The system information manager 1410 may transmit, to a UE, a system information message including a first indication of a first transmission timing offset for a cell in an NTN.

The RRC manager 1415 may transmit, to the UE, an RRC message including a second indication of a second transmission timing offset that is based on an RTT for communications between the UE and the cell in the NTN, where the second transmission timing offset is less than the first transmission timing offset. In some examples, the RRC manager 1415 may establish an RRC connection with the UE based on the RACH message, where the RRC message is transmitted based on the RRC connection.

The uplink manager 1420 may receive, from the UE, an uplink message based on the second transmission timing offset. In some examples, the uplink manager 1420 may receive, from the UE, the first uplink message after transmitting the second DCI message. In some examples, the uplink manager 1420 may determine an uplink slot for reception of the uplink message based on the second transmission timing offset and a downlink slot associated with a DCI message corresponding to the uplink message, where the uplink message is received based on the uplink slot.

The RACH manager 1425 may receive, from the UE, a RACH message based on the first transmission timing offset.

The RNTI manager 1430 may identify an RNTI associated with the RACH message, where the first transmission timing offset associated with the RACH message is based on the RNTI. In some examples, the RNTI manager 1430 may identify an RNTI associated with a DCI message.

The transmission timing offset manager 1435 may determine the second transmission timing offset based on a TA and a differential offset associated with the UE, where the RACH message includes a third indication of the TA and the differential offset. In some examples, determining the second transmission timing offset based on adding the first transmission timing offset and a negative offset, where the second indication includes the negative offset. In some cases, the second transmission timing offset is based on the third indication of the TA and the differential offset.

The RTT manager 1440 may determine the RTT for communications between the UE and the cell of the NTN, where the TA and the differential offset is based on the RTT.

The DCI manager 1445 may transmit, to a UE, a first DCI message scheduling a first uplink message associated with a HARQ process. In some examples, the DCI manager 1445 may transmit, to the UE based on a separation threshold associated with communications between the UE and a cell in an NTN, a second DCI message scheduling a second uplink message associated with the HARQ process. In some examples, the DCI manager 1445 may transmit, to the UE, the DCI message including a grant for the uplink message, where the second transmission timing offset associated with the uplink message is based on the RNTI. In some examples, the DCI manager 1445 may transmit a DCI message including a grant for a downlink shared channel message, where the uplink message includes ACK feedback for the downlink shared channel message.

In some examples, the DCI manager 1445 may determine that the first uplink message and the second uplink message are associated with a same TB, where the second DCI message is transmitted prior to the receiving of the first uplink message based on the determining that the first uplink message and the second uplink message are associated with a same TB. In some cases, a time duration between the first uplink message and the second uplink message includes a separation threshold. In some cases, a time duration between the first DCI message and the second DCI message includes a separation threshold. In some cases, the separation threshold includes a quantity of slots or a quantity of symbols. In some cases, the separation threshold is based on a numerology. In some cases, the second DCI message is transmitted within a time interval prior to transmitting the first uplink message. In some cases, the time interval is based on a transmission timing offset and a TA associated with transmitting the first uplink message.

The HARQ manager 1450 may determine that the HARQ process is associated with a single transmission attempt, where the second DCI message is transmitted prior to the receiving of the first uplink message based on the determining that the HARQ process is associated with the single transmission attempt. In some examples, the HARQ manager 1450 may receive a first indication of a first quantity of supported HARQ processes based on a capability of the UE.

In some examples, the HARQ manager 1450 may transmit a second indication of a second quantity of HARQ processes based on the first indication of the first quantity of supported HARQ processes, where an ID of the HARQ process is based on the second quantity of HARQ processes. In some cases, the second quantity of HARQ processes is based on one or more of a TA associated with transmitting the first uplink message, a numerology, and a differential offset associated with the UE. In some cases, the second quantity of HARQ processes is based on an NTN cell.

The PDSCH manager 1455 may transmit a downlink shared channel message based on a grant, where the first DCI message includes the grant and where the first uplink message includes ACK feedback for the downlink shared channel message.

Figure 15:
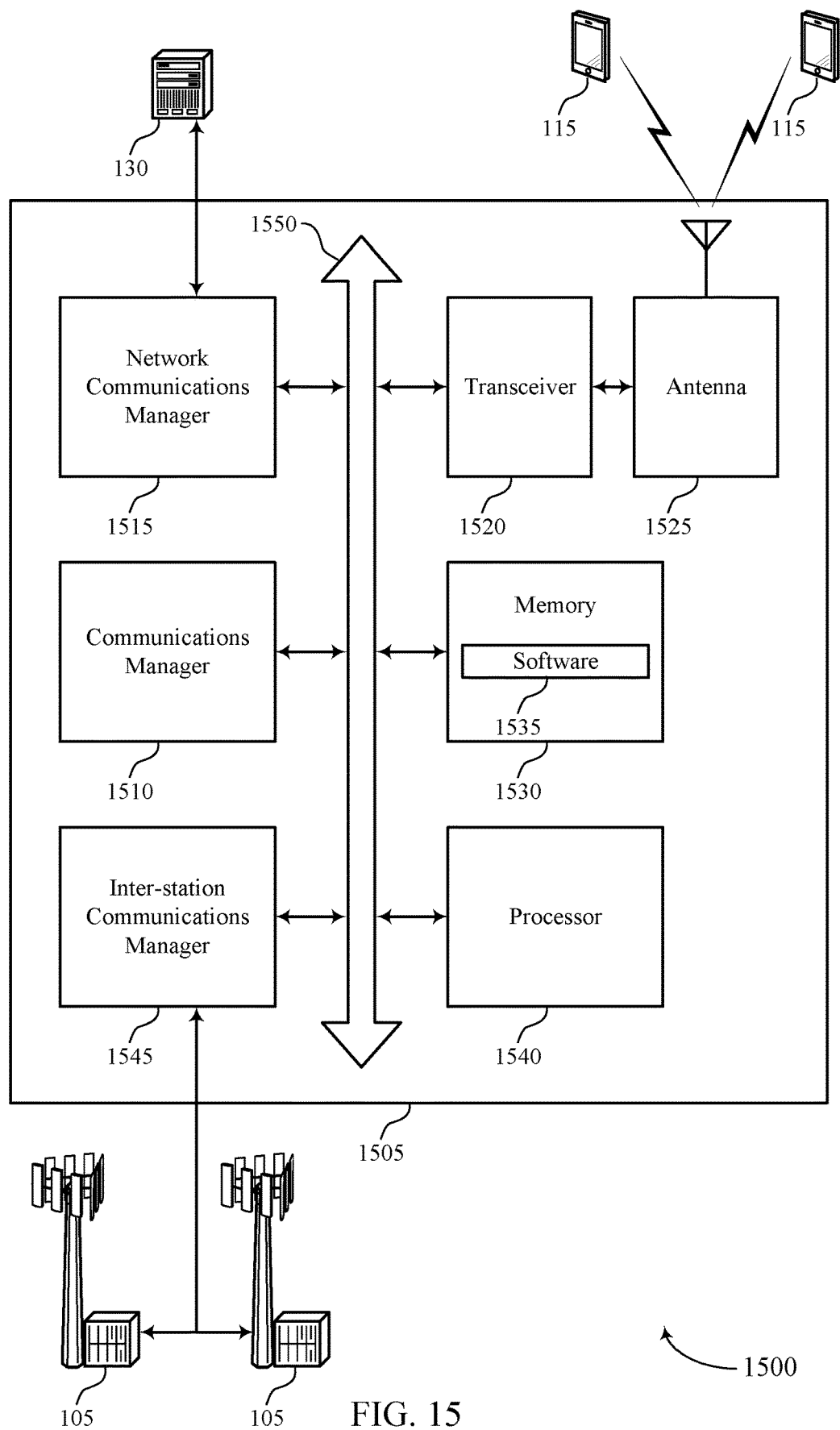

FIG. 15 shows a diagram of a system 1500 including a device 1505 that supports improved data channel timelines in wireless communications systems in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via or coupled with one or more buses (e.g., bus 1550).

In some implementations the communications manager 1510 may transmit, to a UE, a system information message including a first indication of a first transmission timing offset for a cell in an NTN, transmit, to the UE, an RRC message including a second indication of a second transmission timing offset that is based on an RTT for communications between the UE and the cell in the NTN, and receive, from the UE, an uplink message based on the second transmission timing offset.

Additionally or alternatively, the communications manager 1510 may transmit, to a UE, a first DCI message scheduling a first uplink message associated with a HARQ process, transmit, to the UE, a second DCI message scheduling a second uplink message associated with the HARQ process, and receive, from the UE, the first uplink message after transmitting the second DCI message.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code or software 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting improved data channel timelines in wireless communications systems).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The software 1535 may include instructions to implement aspects of the present disclosure, including instructions to support wireless communications. The software 1535 may be stored in a non-transitory computer-readable medium such as system memory or other type of memory. In some cases, the software 1535 may not be directly executable by the processor 1540 but may cause a computer (e.g., when compiled and executed) to perform functions described herein.

Figure 16:
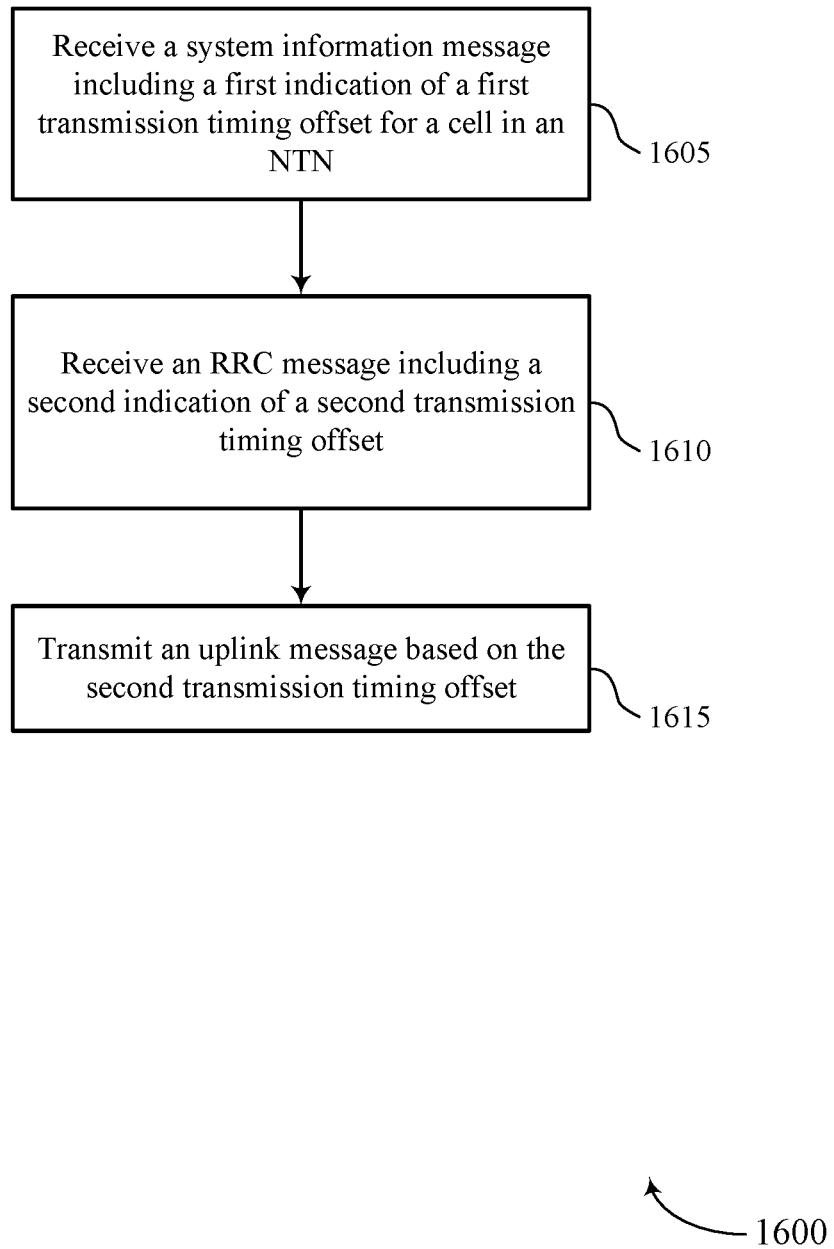
FIGS. 16 through 19 show flowcharts illustrating methods that support improved data channel timelines in wireless communications systems in accordance with aspects of the present disclosure.

FIG. 16 shows a flowchart illustrating a method 1600 that supports improved data channel timelines in wireless communications systems in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive a system information message including a first indication of a first transmission timing offset for a cell in an NTN. The operations of 1605 may be performed according to the methods described herein. In some examples, aspects of the operations of 1605 may be performed by a system information manager as described with reference to FIGS. 8 through 11.

At 1610, the UE may receive an RRC message including a second indication of a second transmission timing offset. In some aspects, the second transmission timing offset is less than the first transmission timing offset. The operations of 1610 may be performed according to the methods described herein. In some examples, aspects of the operations of 1610 may be performed by an RRC manager as described with reference to FIGS. 8 through 11.

At 1615, the UE may transmit an uplink message based on the second transmission timing offset. The operations of 1615 may be performed according to the methods described herein. In some examples, aspects of the operations of 1615 may be performed by a transmission timing offset manager as described with reference to FIGS. 8 through 11.

Figure 17:
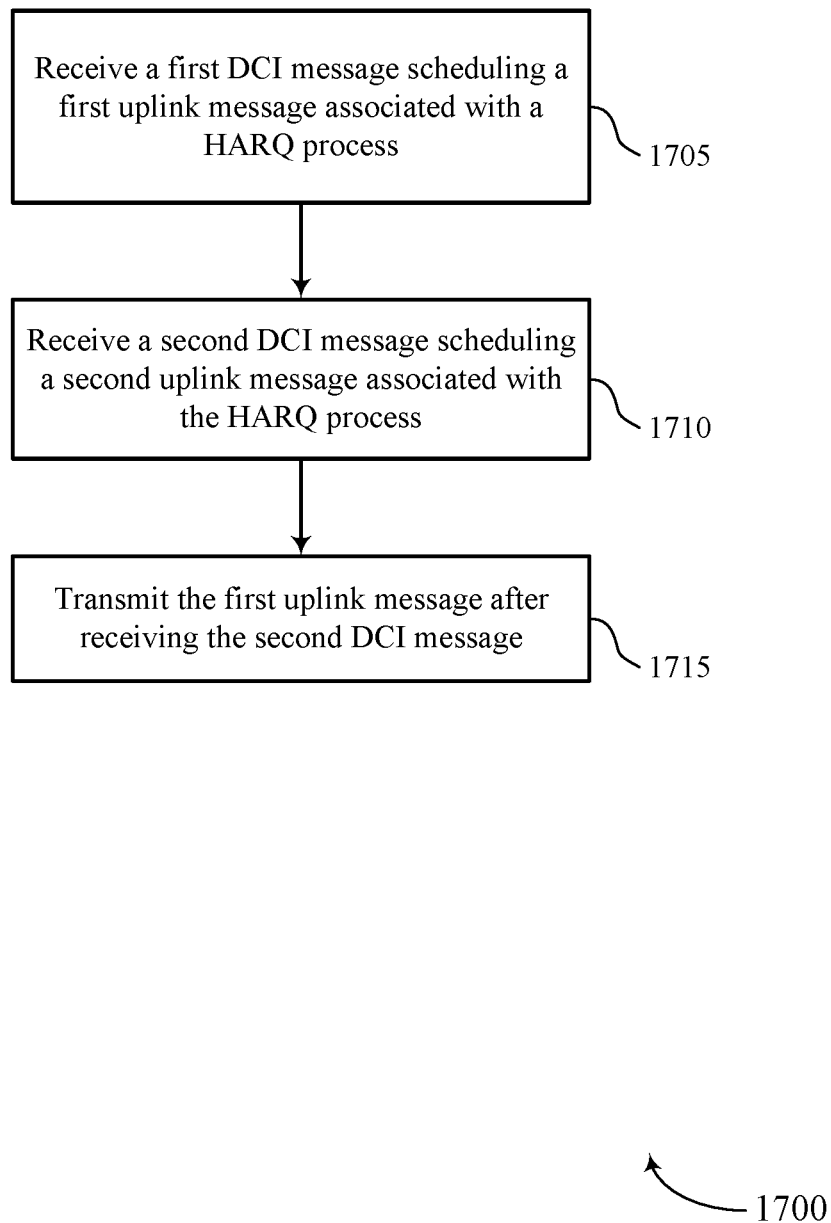

FIG. 17 shows a flowchart illustrating a method 1700 that supports improved data channel timelines in wireless communications systems in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may receive a first DCI message scheduling a first uplink message associated with a HARQ process. The operations of 1705 may be performed according to the methods described herein. In some examples, aspects of the operations of 1705 may be performed by a DCI manager as described with reference to FIGS. 8 through 11.

At 1710, the UE may receive a second DCI message scheduling a second uplink message associated with the HARQ process. The operations of 1710 may be performed according to the methods described herein. In some examples, aspects of the operations of 1710 may be performed by a DCI manager as described with reference to FIGS. 8 through 11.

At 1715, the UE may transmit the first uplink message after receiving the second DCI message. The operations of 1715 may be performed according to the methods described herein. In some examples, aspects of the operations of 1715 may be performed by an uplink manager as described with reference to FIGS. 8 through 11.

Figure 18:
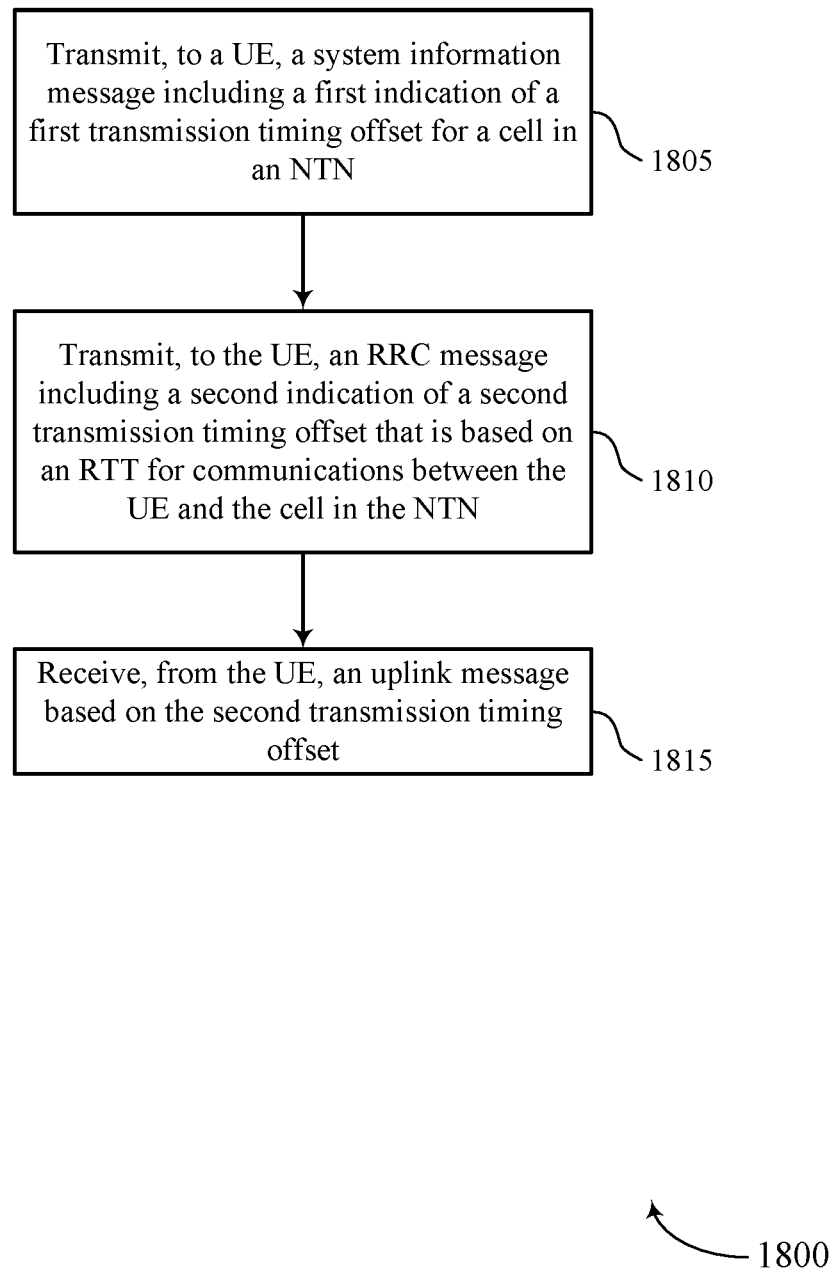

FIG. 18 shows a flowchart illustrating a method 1800 that supports improved data channel timelines in wireless communications systems in accordance with aspects of the present disclosure. The operations of method 1800 may be implemented by a base station 105 or its components as described herein. For example, the operations of method 1800 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a system information message including a first indication of a first transmission timing offset for a cell in an NTN. The operations of 1805 may be performed according to the methods described herein. In some examples, aspects of the operations of 1805 may be performed by a system information manager as described with reference to FIGS. 12 through 15.

At 1810, the base station may transmit, to the UE, an RRC message including a second indication of a second transmission timing offset that is based on an RTT for communications between the UE and the cell in the NTN. In some aspects, the second transmission timing offset is less than the first transmission timing offset. The operations of 1810 may be performed according to the methods described herein. In some examples, aspects of the operations of 1810 may be performed by an RRC manager as described with reference to FIGS. 12 through 15.

At 1815, the base station may receive, from the UE, an uplink message based on the second transmission timing offset. The operations of 1815 may be performed according to the methods described herein. In some examples, aspects of the operations of 1815 may be performed by an uplink manager as described with reference to FIGS. 12 through 15.

Figure 19:
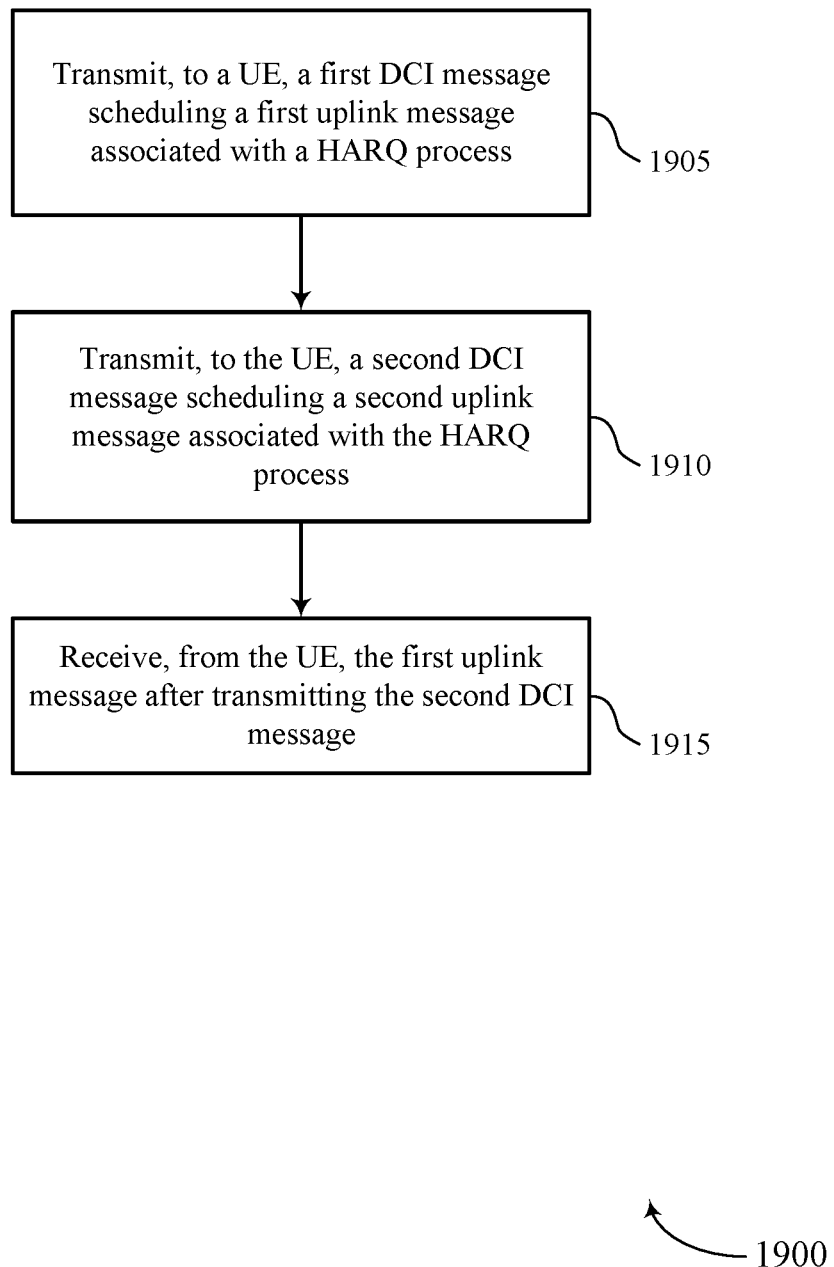

FIG. 19 shows a flowchart illustrating a method 1900 that supports improved data channel timelines in wireless communications systems in accordance with aspects of the present disclosure. The operations of method 1900 may be implemented by a base station 105 or its components as described herein. For example, the operations of method 1900 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, a first DCI message scheduling a first uplink message associated with a HARQ process. The operations of 1905 may be performed according to the methods described herein. In some examples, aspects of the operations of 1905 may be performed by a DCI manager as described with reference to FIGS. 12 through 15.

At 1910, the base station may transmit, to the UE, a second DCI message scheduling a second uplink message associated with the HARQ process. The operations of 1910 may be performed according to the methods described herein. In some examples, aspects of the operations of 1910 may be performed by a DCI manager as described with reference to FIGS. 12 through 15.

At 1915, the base station may receive, from the UE, the first uplink message after transmitting the second DCI message. The operations of 1915 may be performed according to the methods described herein. In some examples, aspects of the operations of 1915 may be performed by an uplink manager as described with reference to FIGS. 12 through 15.

The following provides an overview of aspects of the present disclosure:

Aspect 1: A method for wireless communication at a UE, comprising: receiving a system information message comprising a first indication of a first transmission timing offset for a cell in an NTN; receiving an RRC message comprising a second indication of a second transmission timing offset; and transmitting an uplink message based at least in part on the second transmission timing offset.

Aspect 2: The method of aspect 1, further comprising: transmitting a RACH message based at least in part on the first transmission timing offset; and establishing an RRC connection with a base station based at least in part on the RACH message, wherein the RRC message is received based at least in part on the RRC connection.

Aspect 3: The method of aspect 2, further comprising: identifying an RNTI associated with the RACH message; and applying the first transmission timing offset when transmitting the RACH message based at least in part on the RNTI, wherein the RACH message is transmitted based at least in part on the first transmission timing offset.

Aspect 4: The method of any of aspects 2 through 3, further comprising: determining a TA and a differential offset based at least in part on the first transmission timing offset and an RTT, wherein the RACH message comprises a third indication of the TA and the differential offset.

Aspect 5: The method of aspect 4, further comprising: determining the RTT for communications between the UE and the cell of the NTN, wherein the determining of the TA and the differential offset is based at least in part on the determining of the RTT.

Aspect 6: The method of any of aspects 4 through 5, wherein the second transmission timing offset is based at least in part on the third indication of the TA and the differential offset.

Aspect 7: The method of any of aspects 1 through 6, further comprising: receiving a DCI message comprising a grant for the uplink message; identifying an RNTI associated with the DCI message; and applying the second transmission timing offset when transmitting the uplink message based at least in part on the RNTI, wherein the uplink message is transmitted based at least in part on the grant and the second transmission timing offset.

Aspect 8: The method of any of aspects 1 through 7, further comprising: receiving a DCI message comprising a grant for a downlink shared channel message; monitoring for the downlink shared channel message based at least in part on the grant; and determining ACK feedback for the downlink shared channel message based at least in part on the monitoring, wherein the uplink message comprises the ACK feedback for the downlink shared channel message.

Aspect 9: The method of any of aspects 1 through 8, further comprising: determining the second transmission timing offset based at least in part on adding the first transmission timing offset and a negative offset, wherein the second indication comprises the negative offset.

Aspect 10: The method of any of aspects 1 through 9, wherein the transmitting of the uplink message based at least in part on the second transmission timing offset comprises: determining an uplink slot for transmission of the uplink message based at least in part on the second transmission timing offset and a downlink slot associated with a DCI message corresponding to the uplink message, wherein the uplink message is transmitted in the uplink slot.

Aspect 11: The method of any of aspects 1 through 10, wherein the second transmission timing offset is based at least in part on an RTT for communications between the UE and the cell in the NTN.

Aspect 12: A method for wireless communication at a UE, comprising: receiving a first DCI message scheduling a first uplink message associated with a HARQ process; receiving a second DCI message scheduling a second uplink message associated with the HARQ process; and transmitting the first uplink message after receiving the second DCI message.

Aspect 13: The method of aspect 12, further comprising: identifying that the HARQ process is associated with a single transmission attempt, wherein the transmitting of the first uplink message is based at least in part on the identifying.

Aspect 14: The method of any of aspects 12 through 13, further comprising: identifying that the first uplink message and the second uplink message are associated with a same TB, wherein the transmitting of the first uplink message is based at least in part on the identifying.

Aspect 15: The method of any of aspects 12 through 14, wherein a time duration between the first uplink message and the second uplink message comprises a separation threshold.

Aspect 16: The method of aspect 15, wherein the separation threshold comprises a quantity of slots or a quantity of symbols.

Aspect 17: The method of any of aspects 15 through 16, wherein the separation threshold is based at least in part on a numerology.

Aspect 18: The method of any of aspects 12 through 17, wherein a time duration between the first DCI message and the second DCI message includes a separation threshold.

Aspect 19: The method of any of aspects 12 through 18, wherein the second DCI message is received within a time interval prior to the transmitting of the first uplink message.

Aspect 20: The method of aspect 19, wherein the time interval is based at least in part on a transmission timing offset and a TA associated with the transmitting of the first uplink message.

Aspect 21: The method of any of aspects 12 through 20, further comprising: transmitting a first indication of a first quantity of supported HARQ processes based at least in part on a capability of the UE; and receiving a second indication of a second quantity of HARQ processes based at least in part on the first indication of the first quantity of supported HARQ processes, wherein an ID of the HARQ process is based at least in part on the second quantity of HARQ processes.

Aspect 22: The method of aspect 21, wherein the second quantity of HARQ processes is based at least in part on one or more of a TA associated with the transmitting of the first uplink message, a numerology, and a differential offset associated with the UE.

Aspect 23: The method of any of aspects 21 through 22, wherein the second quantity of HARQ processes is based at least in part on an NTN cell.

Aspect 24: The method of any of aspects 12 through 23, further comprising: monitoring for a first downlink shared channel message based at least in part on a grant, wherein the first DCI message comprises the grant; and determining ACK feedback for the first downlink shared channel message based at least in part on the monitoring, wherein the first uplink message comprises the ACK feedback for the first downlink shared channel message.

Aspect 25: The method of aspect 24, wherein a time duration between the first downlink shared channel message and a second downlink shared channel message comprises a separation threshold.

Aspect 26: A method for wireless communication at a base station, comprising: transmitting, to a UE, a system information message comprising a first indication of a first transmission timing offset for a cell in an NTN; transmitting, to the UE, an RRC message comprising a second indication of a second transmission timing offset that is based at least in part on an RTT for communications between the UE and the cell in the NTN; and receiving, from the UE, an uplink message based at least in part on the second transmission timing offset.

Aspect 27: The method of aspect 26, further comprising: receiving, from the UE, a RACH message based at least in part on the first transmission timing offset; and establishing an RRC connection with the UE based at least in part on the RACH message, wherein the RRC message is transmitted based at least in part on the RRC connection.

Aspect 28: The method of aspect 27, further comprising: identifying an RNTI associated with the RACH message, wherein the first transmission timing offset associated with the RACH message is based at least in part on the RNTI.

Aspect 29: The method of any of aspects 27 through 28, further comprising: determining the second transmission timing offset based at least in part on a TA and a differential offset associated with the UE, wherein the RACH message comprises a third indication of the TA and the differential offset.

Aspect 30: The method of aspect 29, further comprising: determining the RTT for communications between the UE and the cell of the NTN, wherein the TA and the differential offset is based at least in part on the RTT.

Aspect 31: The method of any of aspects 29 through 30, wherein the second transmission timing offset is based at least in part on the third indication of the TA and the differential offset.

Aspect 32: The method of any of aspects 26 through 31, further comprising: identifying an RNTI associated with a DCI message; and transmitting, to the UE, the DCI message comprising a grant for the uplink message, wherein the second transmission timing offset associated with the uplink message is based at least in part on the RNTI.

Aspect 33: The method of any of aspects 26 through 32, further comprising: transmitting a DCI message comprising a grant for a downlink shared channel message, wherein the uplink message comprises ACK feedback for the downlink shared channel message.

Aspect 34: The method of any of aspects 26 through 33, further comprising: determining the second transmission timing offset based at least in part on adding the first transmission timing offset and a negative offset, wherein the second indication comprises the negative offset.

Aspect 35: The method of any of aspects 26 through 34, wherein the receiving of the uplink message based at least in part on the second transmission timing offset comprises: determining an uplink slot for reception of the uplink message based at least in part on the second transmission timing offset and a downlink slot associated with a DCI message corresponding to the uplink message, wherein the uplink message is received based at least in part on the uplink slot.

Aspect 36: A method for wireless communication at a base station, comprising: transmitting, to a UE, a first DCI message scheduling a first uplink message associated with a HARQ process; transmitting, to the UE, a second DCI message scheduling a second uplink message associated with the HARQ process; and receiving, from the UE, the first uplink message after transmitting the second DCI message.

Aspect 37: The method of aspect 36, further comprising: determining that the HARQ process is associated with a single transmission attempt, wherein the second DCI message is transmitted prior to the receiving of the first uplink message based at least in part on the determining that the HARQ process is associated with the single transmission attempt.

Aspect 38: The method of any of aspects 36 through 37, further comprising: determining that the first uplink message and the second uplink message are associated with a same TB, wherein the second DCI message is transmitted prior to the receiving of the first uplink message based at least in part on the determining that the first uplink message and the second uplink message are associated with a same TB.

Aspect 39: The method of any of aspects 36 through 38, wherein a time duration between the first uplink message and the second uplink message comprises a separation threshold.

Aspect 40: The method of aspect 39, wherein the separation threshold comprises a quantity of slots or a quantity of symbols.

Aspect 41: The method of any of aspects 39 through 40, wherein the separation threshold is based at least in part on a numerology.

Aspect 42: The method of any of aspects 36 through 41, wherein a time duration between the first DCI message and the second DCI message includes a separation threshold.

Aspect 43: The method of any of aspects 36 through 42, wherein the second DCI message is transmitted within a time interval prior to transmitting the first uplink message.

Aspect 44: The method of aspect 43, wherein the time interval is based at least in part on a transmission timing offset and a TA associated with the transmitting of the first uplink message.

Aspect 45: The method of any of aspects 36 through 44, further comprising: receiving a first indication of a first quantity of supported HARQ processes based at least in part on a capability of the UE; and transmitting a second indication of a second quantity of HARQ processes based at least in part on the first indication of the first quantity of supported HARQ processes, wherein an ID of the HARQ process is based at least in part on the second quantity of HARQ processes.

Aspect 46: The method of aspect 45, wherein the second quantity of HARQ processes is based at least in part on one or more of a TA associated with the transmitting of the first uplink message, a numerology, and a differential offset associated with the UE.

Aspect 47: The method of any of aspects 45 through 46, wherein the second quantity of HARQ processes is based at least in part on an NTN cell.

Aspect 48: The method of any of aspects 36 through 47, further comprising: transmitting a downlink shared channel message based at least in part on a grant, wherein the first DCI message comprises the grant and wherein the first uplink message comprises ACK feedback for the downlink shared channel message.

Aspect 49: An apparatus for wireless communication at a UE, comprising a processor; memory coupled with the processor; and instructions stored in the memory and operable, when executed by the processor, to cause the apparatus to perform a method of any of aspects 1 through 11.

Aspect 50: An apparatus for wireless communication at a UE, comprising at least one means for performing a method of any of aspects 1 through 11.

Aspect 51: A non-transitory computer-readable medium storing code for wireless communication at a UE, the code comprising instructions executable by a processor to perform a method of any of aspects 1 through 11.

Aspect 52: An apparatus for wireless communication at a UE, comprising a processor; memory coupled with the processor; and instructions stored in the memory and operable, when executed by the processor, to cause the apparatus to perform a method of any of aspects 12 through 25.

Aspect 53: An apparatus for wireless communication at a UE, comprising at least one means for performing a method of any of aspects 12 through 25.

Aspect 54: A non-transitory computer-readable medium storing code for wireless communication at a UE, the code comprising instructions executable by a processor to perform a method of any of aspects 12 through 25.

Aspect 55: An apparatus for wireless communication at a base station, comprising a processor; memory coupled with the processor; and instructions stored in the memory and operable, when executed by the processor, to cause the apparatus to perform a method of any of aspects 26 through 35.

Aspect 56: An apparatus for wireless communication at a base station, comprising at least one means for performing a method of any of aspects 26 through 35.

Aspect 57: A non-transitory computer-readable medium storing code for wireless communication at a base station, the code comprising instructions executable by a processor to perform a method of any of aspects 26 through 35.

Aspect 58: An apparatus for wireless communication at a base station, comprising a processor; memory coupled with the processor; and instructions stored in the memory and operable, when executed by the processor, to cause the apparatus to perform a method of any of aspects 36 through 48.

Aspect 59: An apparatus for wireless communication at a base station, comprising at least one means for performing a method of any of aspects 36 through 48.

Aspect 60: A non-transitory computer-readable medium storing code for wireless communication at a base station, the code comprising instructions executable by a processor to perform a method of any of aspects 36 through 48.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
    receiving a first downlink shared channel message associated with a hybrid automatic repeat request process; and
    receiving, after a first time duration from an end of the first downlink shared channel message, a second downlink shared channel message associated with the hybrid automatic repeat request process, wherein receiving the second downlink shared channel message after the first time duration is based at least in part on hybrid automatic repeat request feedback being disabled for the hybrid automatic repeat request process.

2. The method of claim 1, further comprising:
    receiving a first control information message scheduling a first message associated with the hybrid automatic repeat request process; and
    transmitting the first message, wherein the transmitting of the first message is based at least in part on the hybrid automatic repeat request process being associated with a single transmission attempt.

3. The method of claim 2, further comprising:
    receiving a second control information message associated with the hybrid automatic repeat request process, wherein the transmitting of the first message is based at least in part on the first message and the second message being associated with a same transport block.

4. The method of claim 3, wherein the second control information message is received within a time interval prior to transmitting the first message.

5. The method of claim 4, wherein the time interval is based at least in part on a transmission timing offset and a timing advance associated with transmitting the first message.

6. The method of claim 3, wherein a time duration between a scheduled transmission of the first message and a scheduled transmission of the second message is greater than or equal to a separation threshold.

7. The method of claim 2, further comprising:
    monitoring for the second downlink shared channel message based at least in part on a grant, wherein the first control information message comprises the grant, wherein the first message comprises acknowledgement feedback for the second downlink shared channel message.

8. The method of claim 1, wherein the first time duration is greater than or equal to a separation threshold.

9. The method of claim 8, wherein the separation threshold comprises a quantity of slots or a quantity of symbols.

10. The method of claim 8, wherein the separation threshold is based at least in part on a numerology.

11. The method of claim 1, further comprising:
transmitting a first indication of a first quantity of supported hybrid automatic repeat request processes based at least in part on a capability of the user equipment; and
receiving a second indication of a second quantity of hybrid automatic repeat request processes based at least in part on the first indication of the first quantity of supported hybrid automatic repeat request processes, wherein an identifier of the hybrid automatic repeat request process is based at least in part on the second quantity of hybrid automatic repeat request processes.

12. The method of claim 11, wherein the second quantity of hybrid automatic repeat request processes is based at least in part on one or more of a timing advance associated with the user equipment, a numerology, and a differential offset associated with the user equipment.

13. The method of claim 11, wherein the second quantity of hybrid automatic repeat request processes is based at least in part on a non-terrestrial network cell.

14. A method for wireless communication at an access network entity, comprising:
transmitting a first downlink shared channel message associated with a hybrid automatic repeat request process; and
transmitting, after a first time duration from an end of the first downlink shared channel message, a second downlink shared channel message associated with the hybrid automatic repeat request process, wherein transmitting the second shared channel message after the first time duration is based at least in part on hybrid automatic repeat request feedback being disabled for the hybrid automatic repeat request process.

15. The method of claim 14, further comprising:
transmitting a first control information message scheduling a first message associated with the hybrid automatic repeat request process;
transmitting a second control information message associated with the hybrid automatic repeat request process; and
receiving the first message, wherein the hybrid automatic repeat request process is associated with a single transmission attempt, wherein the second control information message is transmitted prior to the receiving of the first message based at least in part on the hybrid automatic repeat request process being associated with the single transmission attempt.

16. The method of claim 15, wherein the second control information message is transmitted within a time interval prior to transmitting the first message.

17. The method of claim 16, wherein the time interval is based at least in part on a transmission timing offset and a timing advance associated with transmitting the first message.

18. The method of claim 16, wherein the second control information message is transmitted prior to the receiving of the first message based at least in part on the first message and the second message being associated with a same transport block.

19. The method of claim 16, wherein a time duration between the first message and the second message comprises a separation threshold.

20. The method of claim 15, wherein transmitting the second downlink shared channel message is
based at least in part on a grant, wherein the first control information message comprises the grant and wherein the first message comprises acknowledgement feedback for the shared channel message.

21. The method of claim 14, wherein the first time duration is greater than or equal to a separation threshold that comprises a time duration between the first downlink shared channel message and the second downlink shared channel message.

22. The method of claim 14, wherein the first time duration is greater than or equal to a separation threshold that comprises a number of slots or a number of symbols.

23. The method of claim 14, wherein the first time duration is greater than or equal to a separation threshold that is based at least in part on a numerology.

24. The method of claim 14, further comprising:
receiving a first indication of a first quantity of supported hybrid automatic repeat request processes based at least in part on a capability of a user equipment; and
transmitting a second indication of a second quantity of hybrid automatic repeat request processes based at least in part on the first indication of the first quantity of supported hybrid automatic repeat request processes, wherein an identifier of the hybrid automatic repeat request process is based at least in part on the second quantity of hybrid automatic repeat request processes.

25. The method of claim 24, wherein the second quantity of hybrid automatic repeat request processes is based at least in part on one or more of a timing advance associated with the user equipment, a numerology, and a differential offset associated with the user equipment.

26. The method of claim 24, wherein the second quantity of hybrid automatic repeat request processes is based at least in part on a non-terrestrial network cell.

27. An apparatus for wireless communication, comprising:
at least one processor;
memory comprising instructions executable by the at least one processor to cause the UE to:
receive a first downlink shared channel message scheduling a first message associated with a hybrid automatic repeat request process; and
receive, after a first time duration from an end of the first downlink shared channel message, a second downlink shared channel message scheduling a second message associated with the hybrid automatic repeat request process, wherein receiving the second downlink shared channel message after the first time duration is based at least in part on hybrid automatic repeat request feedback being disabled for the hybrid automatic repeat request process.

28. The apparatus of claim 27, further comprising:
a transceiver via which the first downlink shared channel message and the second downlink shared channel message are received, wherein the apparatus is configured as a user equipment.

* * * * *